US011893329B1

(12) United States Patent
Rougier et al.

(10) Patent No.: US 11,893,329 B1
(45) Date of Patent: Feb. 6, 2024

(54) FLUID-STRUCTURE INTERACTION SOLVER FOR TRANSIENT DYNAMICS OF FRACTURING MEDIA

(71) Applicants: Triad National Security, LLC, Los Alamos, NM (US); Antonio Munjiza, London (GB)

(72) Inventors: Esteban Rougier, Los Alamos, NM (US); Earl E. Knight, Rio Rancho, NM (US); Zhou Lei, Los Alamos, NM (US); Antonio Munjiza, London (GB)

(73) Assignee: Triad National Security, LLC, Los Alamos, NM (US)

( * ) Notice: Subject to any disclaimer, the term of this patent is extended or adjusted under 35 U.S.C. 154(b) by 451 days.

(21) Appl. No.: 17/133,247

(22) Filed: Dec. 23, 2020

Related U.S. Application Data

(60) Provisional application No. 62/953,346, filed on Dec. 24, 2019.

(51) Int. Cl.
*G06F 30/28* (2020.01)

(52) U.S. Cl.
CPC .................... *G06F 30/28* (2020.01)

(58) Field of Classification Search
CPC ................ G06F 30/28; G06F 30/20
See application file for complete search history.

(56) References Cited

U.S. PATENT DOCUMENTS

2004/0012585 A1* 1/2004 Takahashi ............... G06T 13/20
345/419

FOREIGN PATENT DOCUMENTS

CN 104866712 B * 8/2017

OTHER PUBLICATIONS

Salih, Mohammed Suleman Aldlemy, Mohammad Rasidi Rasani, et al., Thin and sharp edges bodies-fluid interaction simulation using cutcell immersed boundary method, Engineering Applications of Computational Fluid Mechanics, 13:1, 860-877 (Aug. 8, 2019) (Year: 2019).*
Barthès-Biesel, "Motion of a spherical microcapsule freely suspended in a linear shear flow," *Journal of Fluid Mechanics*, 100(4):831-853 (Feb. 26, 1980).
Botella et al., "Benchmark spectral results on the lid-driven cavity flow," Computers and Fluids, 27(4): 421-433 (May 1, 1998).
Carey et al, "Fracture-permeability behavior of shale," *The Journal of Unconventional Oil and Gas Resources*, 11:27-43 (Sep. 2015).

(Continued)

*Primary Examiner* — Steven W Crabb
(74) *Attorney, Agent, or Firm* — Klarquist Sparkman, LLP

(57) ABSTRACT

Computer implemented methods include providing a numerical simulation solid mesh comprising a plurality of solid nodes and a numerical simulation fluid mesh comprising a plurality of fluid nodes, and performing a numerical simulation with the solid mesh and fluid mesh including: determining a fluid-solid interaction between the fluid mesh and the solid mesh at a time step by (i) immersing boundaries of the solid and fluid meshes, (ii) computing current corrected fluid and solid velocities using an interaction parameter applied to an intermediate fluid-solid relative velocity, and (iii) computing a fluid-solid interaction force based on the current corrected fluid and solid velocities.

16 Claims, 25 Drawing Sheets

(56) References Cited

OTHER PUBLICATIONS

Chau et al., "Growth model for large branched three-dimensional hydraulic crack system in gas and oil shale," *Philosophical Transaction of the Royal Society*, A374(2078):20150418 (May 21, 2016).
Danaila et al, "Chapter 10: Gas Dynamics: The Riemann Problem and Discontinuous Solutions: Application to the Schock Tube Problem," *An Introduction to Scientific Computing*, Springer, NY, NY. (Jan. 2007).
Engelman et al., "Transient flow past a circular cylinder: a benchmark solution," *International Journal for Numerical Methods in Fluids*, 11(7):985-1000 (Nov. 1990).
Erturk, "Discussions on driven cavity flow," *International Journal for Numerical Methods in Fluids*, 60:275-294 (May 30, 2009).
Euser et al., "Simulation of fracture coalescence in granite via the combined finite-discrete element method," Rock Mechanics and Rock Engineering, https://doi.org/10.1007/s00603-019-01773-0 (Mar. 14, 2019).
Hirt et al., "An arbitrary Lagrangian-Eulerian computing method for all flow speeds," *Journal of Computational Physics*, 14(3):227-253 (Mar. 1974).
Kim et al., "Immersed boundary methods for fluid-structure interaction: A review," *International Journal of Heat and Fluid Flow*, 75:301-309 (Feb. 2019).
Knight et al., "Consortium Proposal for the Advancement of HOSS," Tech. Rep. LA-UR-13-23409, Los Alamos National Laboratory Presentation, 31 pages (May 9, 2013).
Knight et al., "Hybrid Optimization Software Suite (HOSS)—Educational Version," Los Alamos National Laboratory LA-UR-15-27013, 6 pages (Sep. 9, 2015).
Lei et al., "Simulation of discrete cracks driven by nearly incompressible fluid via 2D combined finite-discrete element method," *International Journal for Numerical and Analytical Methods in Geomechanics*, 43(9):1724-1743 (Jun. 25, 2019) https://doi.org/10.1002/nag.2929.
Lisjak et al., "A 2D, fully-coupled, hydro-mechanical, FDEM formulation for modelling fracturing processes in discontinuous, porous rock masses," *Computers and Geotechnics*, 81:1-18 (Jan. 2017).
Moore et al, "Predictive modeling of dynamic fracture growth in brittle materials with machine learning," *Computational Materials Science*, 148(4):46-53 (Jun. 2018).
Munjiza, "The Combined Finite-Discrete Element Method," John Wiley and Sons Ltd. 30 pages (Feb. 25, 2004).
Munjiza et al., "FSIS—A novel Fluid-Solid Interaction Solver for Fracturing and Fragmenting Solids," *Computational Particle Mechanics*, 7(4):789-805 (Jan. 2020).
National Aeronautics and Space Administration. Normal Shock Wave. https://www.grc.nasa.gov/www/k-12/airplane/normal.html, 3 pages, downloaded Oct. 14, 2021.
Peskin, "Flow Patterns Around Heart Valves: A Numerical Method," *Journal of Computational Physics*, 10(2):252-271 (Oct. 1972).
Rahimi-Aghdam et al., "Branching of hydraulic cracks enabling permeability of gas or oil shale with closed natural fractures," *Proceedings of the National Academy of Sciences*, 116(5):1532 (Jan. 11, 2019).
Reisner et al, "A space-time smooth artificial viscosity method for nonlinear conservation laws," *Journal of Computational Physics*, 235:912-933 (Feb. 2013).
Roshko "On the development of turbulent wakes from vortex streets," Report 1191, California Institute of Technology—Work conducted for the National Advisory Committee for Aeronautics (1954).
Rougier et al., "Fluid Driven Rock Deformation via the Combined FEM/DEM Methodology," Proceedings of the 46th US Rock Mechanics/Geomechanics Symposium, American Rock Mechanics Association, Chicago, IL, 5 pages (Jun. 24-27, 2012).
Rougier et al., "HOSS technology overview: Oil and Gas," Conference Los Alamos National Laboratory LA-UR-13-29117, 81 pages (Dec. 2, 2013).
Rougier et al, "LANL-CSM: HOSS—MUNROU technology overview," Presentation, Los Alamos National Laboratory, LA-UR-13-23422, 86 pages (May 10, 2013).
Rougier et al., "Validation of a three-dimensional Finite-Discrete Element Method using experiment results of the Split Hopkinson Pressure Bar Test," *International Journal of Rock Mechanics and Mining Sciences*, 70:101-108 (Sep. 2014).
Sudhakar, et al, "A strongly coupled partitioned approach for fluid-structure-fracture interaction," *International Journal of Numerical Methods in Fluids*, 00:1-21 (Dec. 2017).
Talemi, et al., "Hybrid fluid-structure interaction modelling of dynamic brittle fracture in steel pipelines transporting $CO_2$ streams," *Journal of Greenhouse Gas Control*, 54(2):702-715 (Aug. 11, 2016).
Wang et al., "A novel algorithm of immersed moving boundary scheme for fluid-particle interactions in DEM-LBM," *Computer Methods in Applied Mechanics and Engineering*, 346:109-125 (Apr. 1, 2019).
Wick, "Coupling fluid-structure interaction with phase-field fracture," *Journal of Computational Physics*, 327:67-96 (Dec. 15, 2016).
Yan et al., "A two-dimensional coupled hydro-mechanical finite-discrete model considering porous media flow for simulating hydraulic fracturing," *International Journal of Rock Mechanics and Mining Sciences*, 88:115-128 (Jul. 24, 2016).
Yan et al., "FDEM-flow 3D: a 3D hydro-mechanical coupled model considering the pore seepage of rock matrix for simulating three-dimensional hydraulic fracturing," *Computers and Geotechnics*, 81:212-228 (2017) (accepted Aug. 17, 2016).
Frei et el., "Fluid-Structure Interaction: Modelling, Adaptive Discretisations and Solvers," Walter de Gruyter GmbH (Nov. 20, 2017).
Munjiza et al., "Computational Mechanics of Discontinua," London, John Wiley and Sons Ltd., 273 pages (Mar. 2011).
Munjiza et al., "Large Strain Finite Element Method: A Practical Course," John Wiley and Sons, 670 pages (May 9, 2014).

* cited by examiner

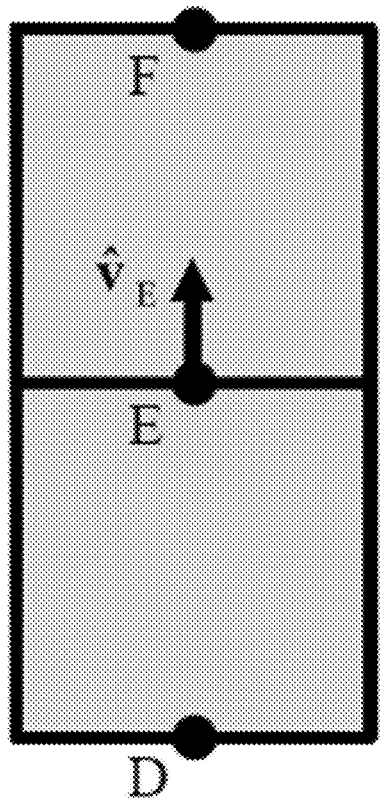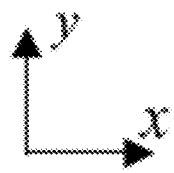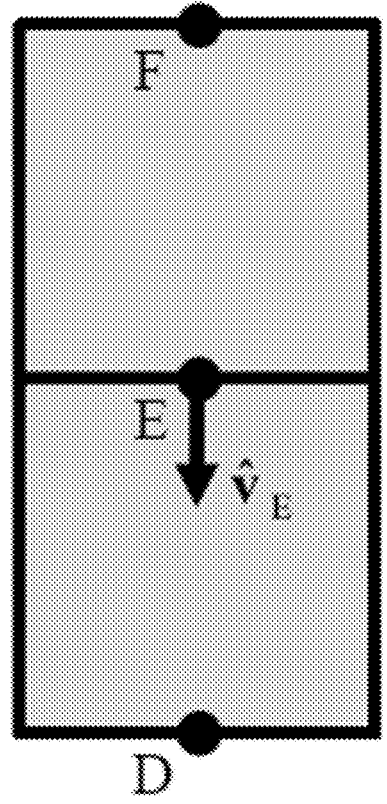
FIG. 7A  FIG. 7B

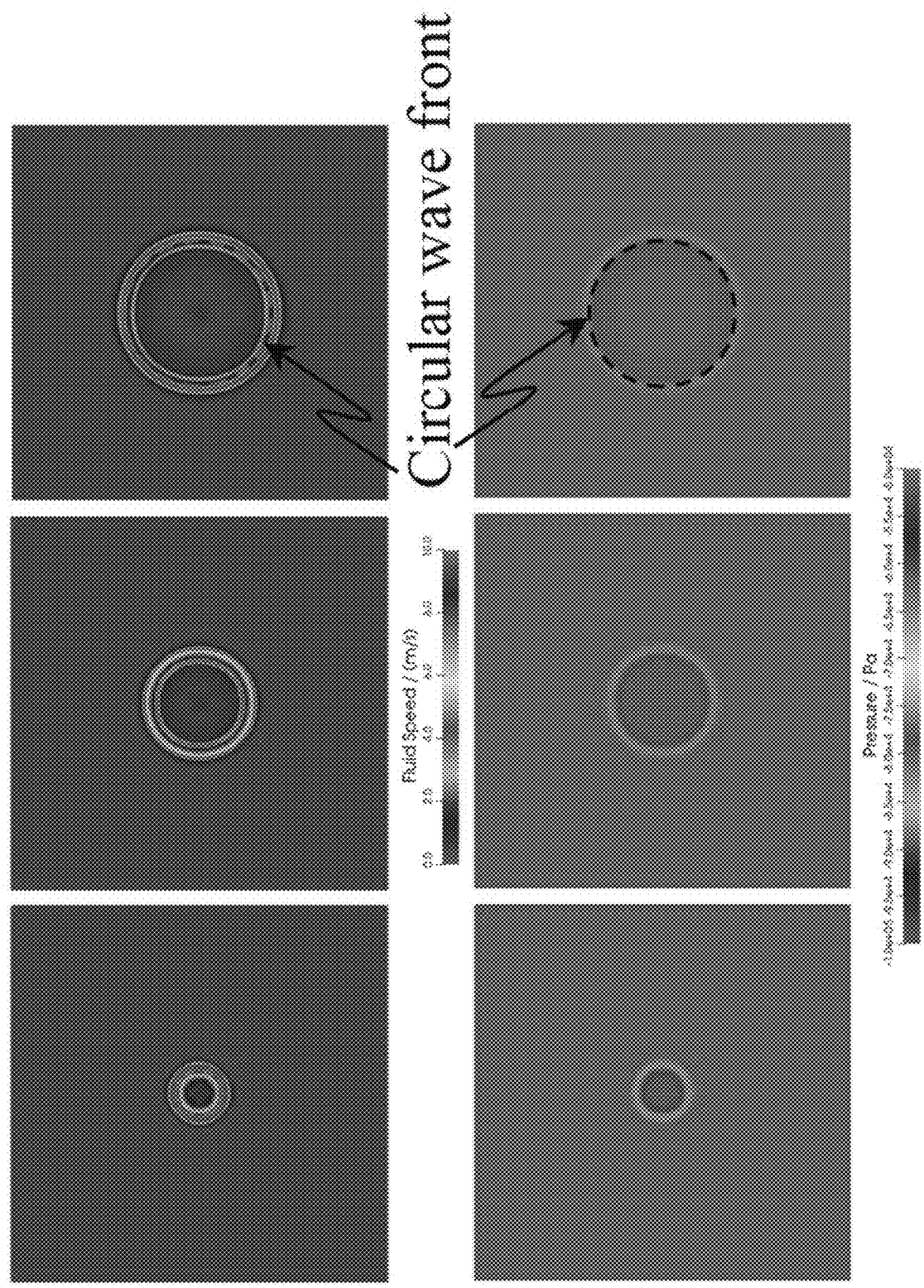

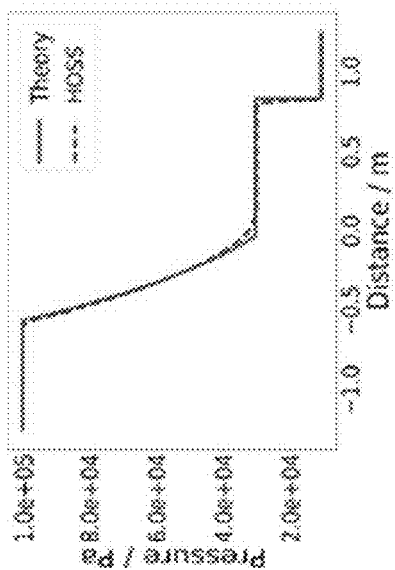
FIG. 15C  Time = 1.5e-3 s
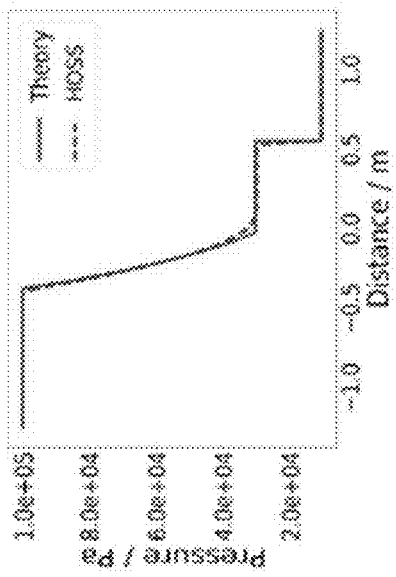
FIG. 15B  Time = 1.0e-3 s
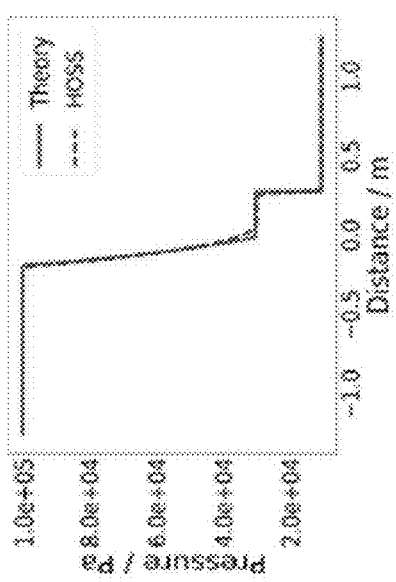
FIG. 15A  Time = 0.5e-3 s

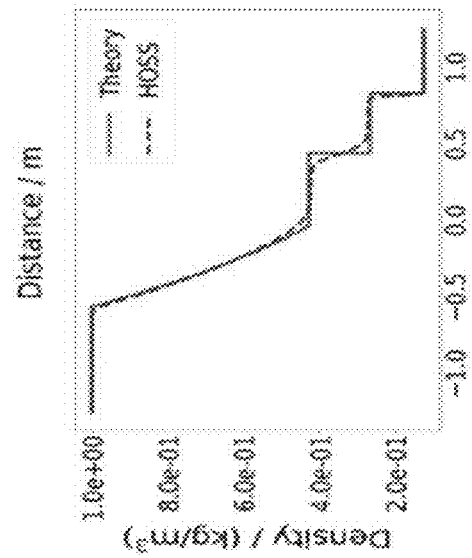
FIG. 15D  Time = 0.5e-3 s
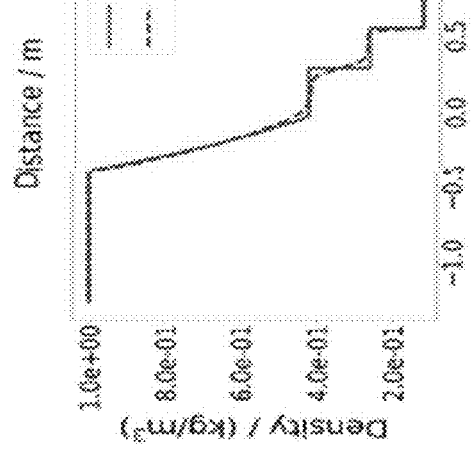
FIG. 15E  Time = 1.0e-3 s
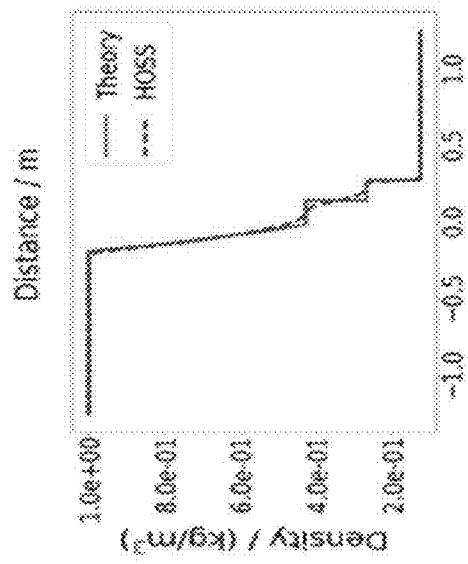
FIG. 15F  Time = 1.5e-3 s

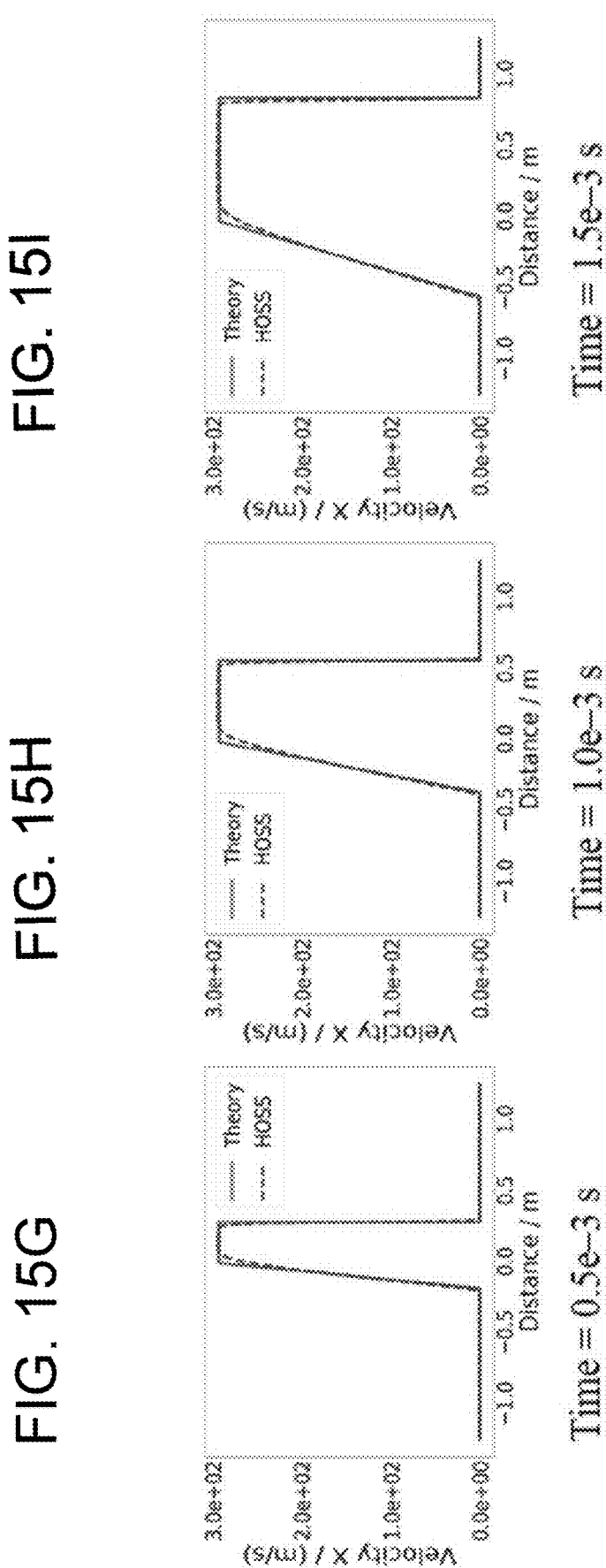

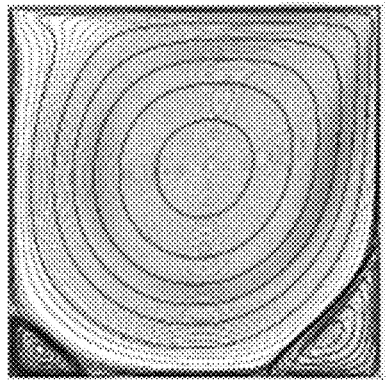 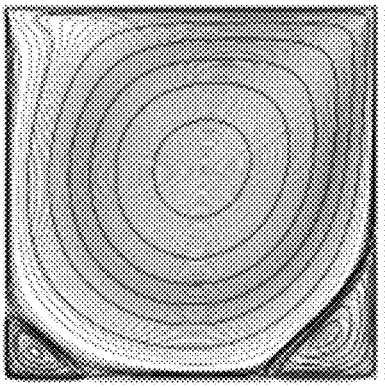 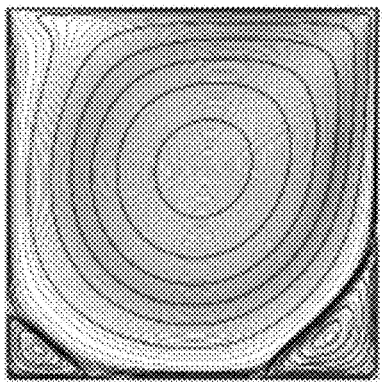
FIG. 19A	FIG. 19B	FIG. 19C
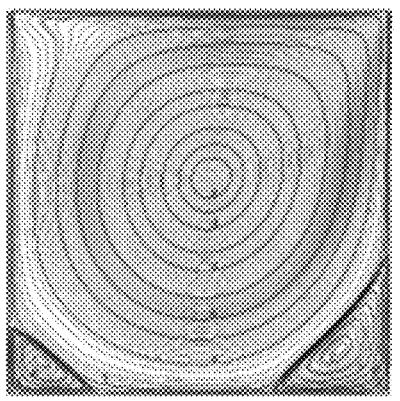 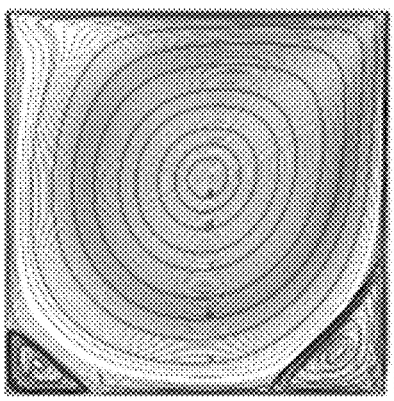 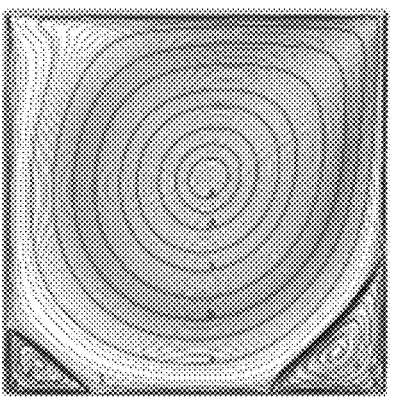
FIG. 20A	FIG. 20B	FIG. 20C

FLUID-STRUCTURE INTERACTION SOLVER FOR TRANSIENT DYNAMICS OF FRACTURING MEDIA

CROSS REFERENCE TO RELATED APPLICATION

This application claims priority to U.S. Provisional Patent Application No. 62/953,346, filed Dec. 24, 2019, which is incorporated by reference herein.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The field is numerical modeling of fluids and fracturing solids.

BACKGROUND

Existing numerical models used to resolve fluid/solid interaction have long suffered from various issues, e.g., excessive computational cost and/or instabilities. Therefore, a need remains for improved approaches without attendant drawbacks.

SUMMARY

According to an aspect of the disclosed technology, computer implemented methods include providing a numerical simulation solid mesh comprising a plurality of solid nodes and a numerical simulation fluid mesh comprising a plurality of fluid nodes, and performing a numerical simulation with the solid mesh and fluid mesh including: determining a fluid-solid interaction between the fluid mesh and the solid mesh at a time step by: (i) immersing boundaries of the solid and fluid meshes, (ii) computing current corrected fluid and solid velocities using an interaction parameter applied to an intermediate fluid-solid relative velocity, and (iii) computing a fluid-solid interaction force based on the current corrected fluid and solid velocities. In some examples, the interaction parameter is an artificial penalty. In some examples, the interaction parameter is a material parameter describing a permeability of a porous solid. In some examples, the determining the fluid-solid interaction comprises an implicit determining within an explicit fluid solver of the numerical simulation. In some examples, the explicit fluid solver is integrated, as opposed to coupled, into a combined finite-discrete element method (FDEM) solver of the numerical simulation. In some examples, the fluid solver has a time step synchronized with a time step of the combined FDEM solver. In some examples, the fluid solver is configured to address fluid transient pressure wave propagation, fluid viscosity, fluid equation of state, energy transport, momentum transport, and interaction with fracturing solid domains. In some examples, the performing the numerical simulation further includes determining values of a viscosity stress tensor of the fluid mesh by splitting the fluid viscosity stress tensor into a pure shear part and a remainder part having different respective control volumes. In some examples, the performing the numerical simulation further comprises donating mass, momentum, and energy of elements of the solid mesh to the fluid mesh at a time step of the numerical simulation based on a material change criterion at the time step. In some examples, the fluid mesh is an Eulerian mesh and the solid mesh is a Lagrangian mesh.

According to another example of the disclosed technology, apparatus include at least one processor, and memory coupled to the at least one processor and configured with instructions that, when executed by the at least one processor, cause the apparatus to perform a numerical simulation with a solid mesh comprising a plurality of solid nodes and a fluid mesh comprising a plurality of fluid nodes including by: determining a fluid-solid interaction between the fluid mesh and the solid mesh at a time step by: (i) immersing boundaries of the solid and fluid meshes, (ii) computing current corrected fluid and solid velocities using an interaction parameter applied to an intermediate fluid-solid relative velocity, and (iii) computing a fluid-solid interaction force based on the current corrected fluid and solid velocities. In some examples, the interaction parameter is an artificial penalty. In some examples, the interaction parameter is a material parameter describing a permeability of a porous solid. In some examples, the determining the fluid-solid interaction comprises an implicit determining within an explicit fluid solver of the numerical simulation. In some examples, the explicit fluid solver is integrated, as opposed to coupled, into a combined finite-discrete element method (FDEM) solver of the numerical simulation. In some examples, the fluid solver has a time step synchronized with a time step of the combined FDEM solver. In some examples, the fluid solver is configured to address fluid transient pressure wave propagation, fluid viscosity, fluid equation of state, energy transport, momentum transport, and interaction with fracturing solid domains. In some examples, the performing the numerical simulation further includes determining values of a viscosity stress tensor of the fluid mesh by splitting the fluid viscosity stress tensor into a pure shear part and a remainder part having different respective control volumes. In some examples, the performing the numerical simulation further includes donating mass, momentum, and energy of elements of the solid mesh to the fluid mesh at a time step of the numerical simulation based on a material change criterion at the time step. In some examples, the fluid mesh is an Eulerian mesh and the solid mesh is a Lagrangian mesh.

The foregoing and other objects, features, and advantages of the disclosed technology will become more apparent from the following detailed description, which proceeds with reference to the accompanying figures.

BRIEF DESCRIPTION OF THE DRAWINGS

FIGS. 7A-7B show transport of y component of the momentum vector in y direction, with $\hat{v}_E>0$ in FIG. 7A and $\hat{v}_E<0$ in FIG. 7B.

FIG. 13 is a temporal sequence of circular pressure wave propagation from a point source.

FIGS. 15A-15I are graphs comparing numerical results with the theoretical solution of the shock tube problem. FIGS. 15A-15C, 15D-15F, and 15G-15I show the evolution of fluid pressure, density, and velocity, respectively. The three columns correspond to simulation times of 0.5e-3 s, 1.0e-3 s and 1.5e-3 s, respectively.

FIG. 17A (left) is a comparison between the theoretical and numerical solution for the x component of the fluid velocity across a cross section of the 2D channel and FIG. 17B (right) is a comparison between the theoretical and numerical solution for the fluid pressure decay along the 2D channel.

FIGS. 19A-19C are a comparison of steady state streamlines for the case of Re=1000 (closely spaced red lines: current work) against the results obtained from Erturk in 2009 (more distantly spaced black lines). FIG. 19A (left): $h_1$=0.00500 m; FIG. 19B (center): $h_2$=0.00250 m; FIG. 19C (right): $h_3$=0.00125 m.

FIGS. 20A-20C are a comparison of steady state streamlines for the case of Re=1000 (closely spaced red lines: current work) against the results obtained from Botella and Peyret in 1998 (more distantly spaced black lines). FIG. 20A (left): $h_1$=0.00500 m; FIG. 20B (center): $h_2$=0.00250 m; FIG. 20C (right): $h_3$=0.00125 m.

FIGS. 26A-26B show fracturing of the rock disk at 5.0e-04 s and 4.0e-03 s respectively. FIGS. 26C-26D are maps of fluid pressure at 5.0e-04 s and 4.0e-03 s respectively.

DETAILED DESCRIPTION

Figure 1:
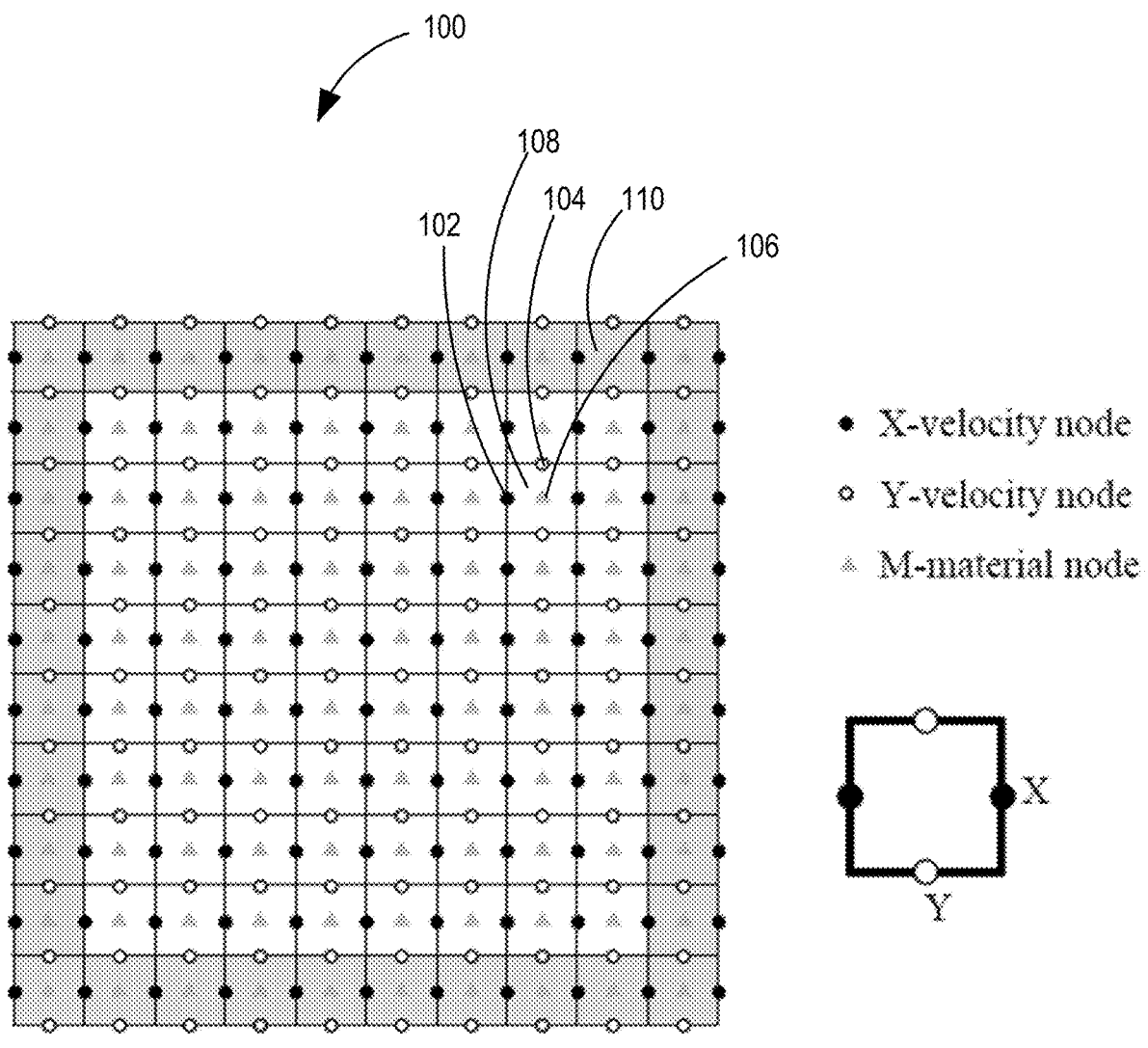
FIG. 1 is a general setup of a single 2D grid.

I. Introduction to Fluid-Solid Interaction Numerical Modeling

Significant challenges in the numerical modeling community over the past four decades include how to accurately resolve the interaction between fluid and solid domains. Barthès-Biesel studied the motion of a spherical particle composed of a thin elastic material submerged in an incompressible Newtonian viscous fluid under shear flow conditions. The Stokes equations were used to describe the fluid, while the nonlinear theory of large deformation was utilized to describe the solid response to stress. In more recent years, transient dynamics of fracturing media has received significant attention and a number of simulation approaches have been developed.

The range of problems involving interaction between solids and fluids is vast in terms of time and length scales. Because of this, it is difficult to establish clear demarcations or categories for the different types of methods used to resolve these problems. In an effort to try to classify the different methods Kim and Choi proposed two main categories that are based on the type of interface between the fluid and solid domains for Fluid-Structure Interaction (FSI) problems; the first category encapsulates all the methods where the fluid mesh conforms to the solid boundaries while the second category groups all the methods where there are overlaps between the fluid and the solid meshes. Arbitrary Lagrangian-Eulerian (ALE) methods are one of the most common examples of the methods belonging to the first category, while Immersed Boundary (TB) and cut-cell methods are examples of those belonging to the second category. Taking a slightly different approach, Wang et al. grouped the FSI methods into: a) those where the fluid behavior is described using continuum-based standard Computational Fluid Dynamics techniques (i.e., Finite Volumes, Finite Elements, Finite Differences) and b) those where the fluid behavior is described using discontinuum-based methods, such as the Lattice Boltzmann Method or Smooth Particle Hydrodynamics. As with any numerical technique, each approach presents unique advantages and disadvantages.

FSI problems are complicated in their own right, however, if one also considers that the solid can break and fracture due to the loads imparted by the fluid then the complexity level increases even further. In this regard, for pure continuum approaches, some efforts have focused on coupling phase field fracture models with different fluid solvers, while others have coupled Extended Finite Element Methods to Computational Fluid Dynamics codes or similar types of approaches. In the realm of the combined finite-discrete element method (FDEM), efforts have been focused on developing fluid-solid interaction solvers mainly aimed at resolving hydraulic fracturing problems. FDEM is arguably one of the more robust simulation tools for problems involving complex fracture and fragmentation patterns in solids. FDEM can produce complex fracture and fragmentation patterns in processes such as blast loads, blasting, impact, mining and oil exploration. With rock blasting, an initiated charge produces hot gases that fracture the rock surrounding it and in turn, the fracture process produces a means for gases to escape into the atmosphere.

However, accurate integration of fluid into the combined finite-discrete element method is generally difficult. To address a wide range of multi-physics problems, numerous approaches have been undertaken to introduce fluid into the FDEM transient dynamics, ranging from application-specific gas models to more advanced hydraulic fracture processes and biomedical applications. None of these has been satisfactory in terms of robustness, accuracy or computational efficiency.

II. Examples of the Disclosed Technology

Examples of the disclosed technology can make fluid solvers more suitable for incorporation into FDEM. Examples can account for a fluid's compressibility and transient dynamics while having low memory consumption and being computationally efficient, highly robust and easy to parallelize. Advantages can be obtained from explicit solvers, in terms of time integration, with a time step that is similar to the solid phase time step. Examples of solvers herein also can allow for several fluid grids that may move with the solid, as necessary. Some examples of the disclosed technology are referred to as "FSIS": Fluid-Solid Interaction Solver. In some examples, explicit fluid solvers are fully integrated (as opposed to coupled) into the combined finite-discrete element method. Solver examples can address transient pressure wave propagation in fluid, fluid viscosity, equation of state for the fluid, energy transport, momentum transport and interaction with the fracturing solid domains, through an immersed boundary approach. Solver examples can be based on the governing equations being resolved using different control volume schemes, with discretization errors of either third, second or first order. Solvers can be fully explicit and conditionally stable with a time step that is synchronized with the FDEM's time step.

The fluid solver portion of FSIS examples can be based on Eulerian grids, such as the Eulerian grid 100 shown in FIG. 1. In some examples, the grid 100 is combined with an operator splitting approach for discretizing different parts of the governing equations, while in the temporal domain a central difference explicit time integration scheme can be used.

The central difference time integration scheme is second order accurate, i.e., the error is proportional to $(\Delta t)^3$, where $\Delta t$ is the time step size. For the spatial domain, three kinds of nodes called X-velocity nodes 102, Y-velocity nodes 104 and M-material nodes 106 are introduced to form cells 108. The X-velocity nodes 102, marked by the dark bullets in FIG. 1, indicate points in space where the x component of a fluid velocity vector is stored. The Y-velocity nodes 104, marked by hollow bullets, indicate points in space where the y component of the fluid velocity vector is stored.

The M-material nodes 106 are located at the center of each square cell where the equation of state for the fluid is considered and pressure is calculated. M-material nodes can also be referred to as "pressure nodes" by those with skill in the art; but the reference as M-material nodes further indicates the role that the equation of state plays in multi-physics FDEM simulations.

In some examples, there may be several Eulerian fluid grids attached to the same FDEM simulation. These grids typically "vent" into vacuum, for instance, rock blasting explosive burning. Shaded 'ghost cells' 110 can be used on the edges of each grid 100.

The equation of state (EOS) can be defined by a designated material package or material library stored or accessible from memory. At M-material nodes the pressure can be calculated using an associated EOS and in order to facilitate this, total mass, total energy, and total volume can be stored for each material node. These values can be passed as input parameters to an EOS module (e.g., within the material package), and the EOS module can subsequently return the corresponding pressure and temperature of the fluid.

With pressure values provided at the material node, nodal forces at X-velocity nodes and Y-velocity nodes can be calculated by multiplying pressure by the cell's edge length, h:

$$f_x = ph$$
$$f_y = ph \quad (1)$$

where $f_x$ is the nodal force in x direction on X-velocity node and $f_y$ is the nodal force in y direction on Y-velocity node, while p is pressure at M-material node. In representative examples, calculated nodal forces can be stored as momentum rates, $\dot{L}$.

Figure 2A:
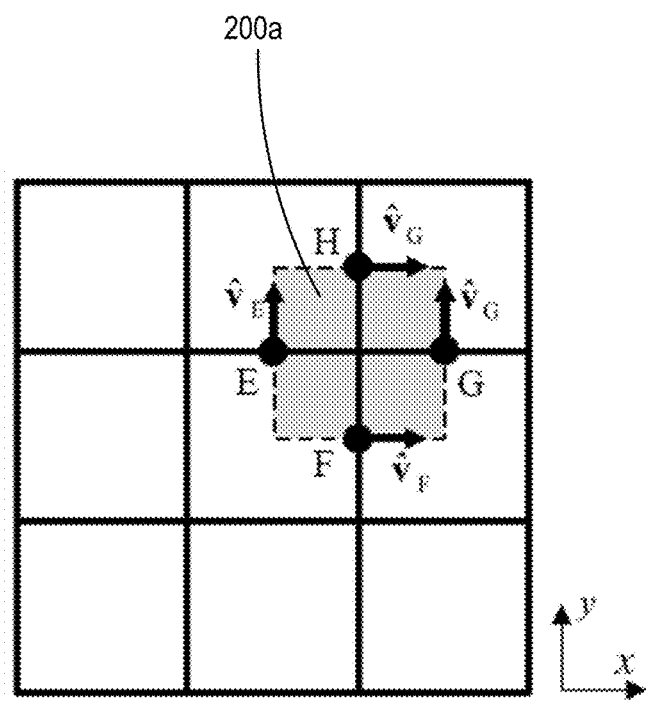
FIG. 2A is pure shear control volume.
Figure 2B:
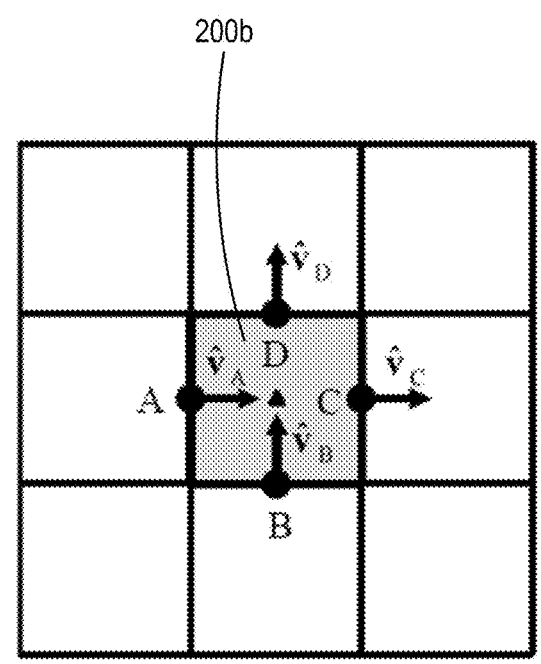
FIG. 2B is the control volume for the rest of the viscosity stress tensor.

FIGS. 2A-2B shows control volumes 200a, 200b that can be defined and used to resolve fluid viscosity, including by considering nodal forces (momentum rates) due to fluid viscosity. Utilizing this approach, a stress tensor due to viscosity can be split into two parts, namely a pure shear part and the rest.

The strain rate for the pure shear part of the viscosity stress tensor (see FIG. 2A) is given by:

$$\dot{\varepsilon}_{xy} = \frac{1}{2} \frac{\hat{v}_{Gy} + \hat{v}_{Hx} - \hat{v}_{Ey} - \hat{v}_{Fx}}{h} \quad (2)$$

where $\hat{v}_{Ey}$, $\hat{v}_{Gy}$ are the y components of the fluid velocity vector at Y-velocity nodes E and G respectively, while $\hat{v}_{Fx}$, $\hat{v}_{Hx}$ are the x components of the fluid velocity vector at X-velocity nodes F and H respectively, while ^ indicates the values at a previous time step, and h is the cell size. The viscosity stress is calculated using the following formula:

$$c_{xy} = 2\mu \dot{\varepsilon}_{xy} \quad (3)$$

where μ is the dynamic viscosity of the fluid. As explained previously, nodal forces due to this stress can be stored as momentum rates at the corresponding X-velocity nodes and Y-velocity nodes, e.g., nodes E, F, G, and H:

$$\dot{L}_{Ey} = \dot{L}_{Ey} + c_{xy}h$$
$$\dot{L}_{Fx} = \dot{L}_{Fx} + c_{xy}h$$
$$\dot{L}_{Gy} = \dot{L}_{Gy} - c_{xy}h$$
$$\dot{L}_{Hx} = \dot{L}_{Hx} - c_{xy}h \quad (4)$$

where, in an example implementation, the old stored value of the momentum rate (right hand-side of the equation) can be replaced by the updated value (left hand-side of the equation).

The rest of the viscosity stress tensor (see FIG. 2B) is calculated using the following strain rates:

$$\dot{\varepsilon}_{xx} = \frac{\hat{v}_{Cx} - \hat{v}_{Ax}}{h} \quad (5)$$
$$\dot{\varepsilon}_{yy} = \frac{\hat{v}_{Dy} - \hat{v}_{By}}{h}$$

where $\hat{v}_{By}$, $\hat{v}_{Dy}$ are the y component of the fluid velocity vector at Y-velocity nodes B and D respectively, while $\hat{v}_{Ax}$, $\hat{v}_{Cx}$ are the x component of the fluid velocity vector at X-velocity nodes A and C respectively, while ^ indicates values at the previous time step and h is the cell size. The volumetric part of the strain rate tensor is given by:

$$\dot{\varepsilon}_s = \dot{\varepsilon}_{xx} + \dot{\varepsilon}_{yy} \quad (6)$$

and is used to calculate pressure due to volumetric viscosity; using the following formula:

$$p_v = \alpha \tilde{\rho} a(\dot{\varepsilon}_s h) + \beta \tilde{\rho}(\dot{\varepsilon}_s h)(|\dot{\varepsilon}_s|h) \quad (7)$$

where $\alpha$ and $\beta$ are the coefficients for the linear and quadratic viscosity respectively, a is the sound speed in the fluid and $\tilde{\rho}$ is the material node's fluid density at the current time step. Thus, there are linear and quadratic components used in calculating viscous stress; and can be analogous to similar approaches adopted elsewhere. This viscous pressure can usually refer to energy dissipation due to phenomena such as shock wave propagation. In addition to the above calculated viscous pressure, the following viscous stress is calculated:

$$c_{xx} = \xi \dot{\varepsilon}_s + 2\mu\left(\dot{\varepsilon}_{xx} - \frac{\dot{\varepsilon}_s}{3}\right) \quad (8)$$

$$c_{yy} = \xi \dot{\varepsilon}_s + 2\mu\left(\dot{\varepsilon}_{yy} - \frac{\dot{\varepsilon}_s}{3}\right) \quad (9)$$

where $\mu$ and $\xi$ are the first (or dynamic) and second viscosity coefficients respectively. The nodal forces due to the above viscous stress can be stored as momentum rates at X-velocity nodes A, B and Y-velocity nodes C, D. The momentum rates are updated as follows:

$$\dot{L}_{Ax} = \dot{L}_{Ax} + (c_{xx} + p_v)h$$

$$\dot{L}_{Bx} = \dot{L}_{Bx} + (c_{yy} + p_v)h$$

$$\dot{L}_{Cx} = \dot{L}_{Cx} - (c_{xx} + p_v)h$$

$$\dot{L}_{Dx} = \dot{L}_{Dx} - (c_{yy} + p_v)h \quad (10)$$

It is worth noting that the scheme examples introduced above lead to nodal forces due to viscosity being integrated with second order accuracy in the space domain, which means that a parabolic velocity profile due to viscosity can be integrated exactly, as demonstrated in the benchmarking discussion below. In general, with the scheme examples, the constitutive law is decomposed into a pure shear component and the rest, which may not always be convenient or even possible.

Figure 3:
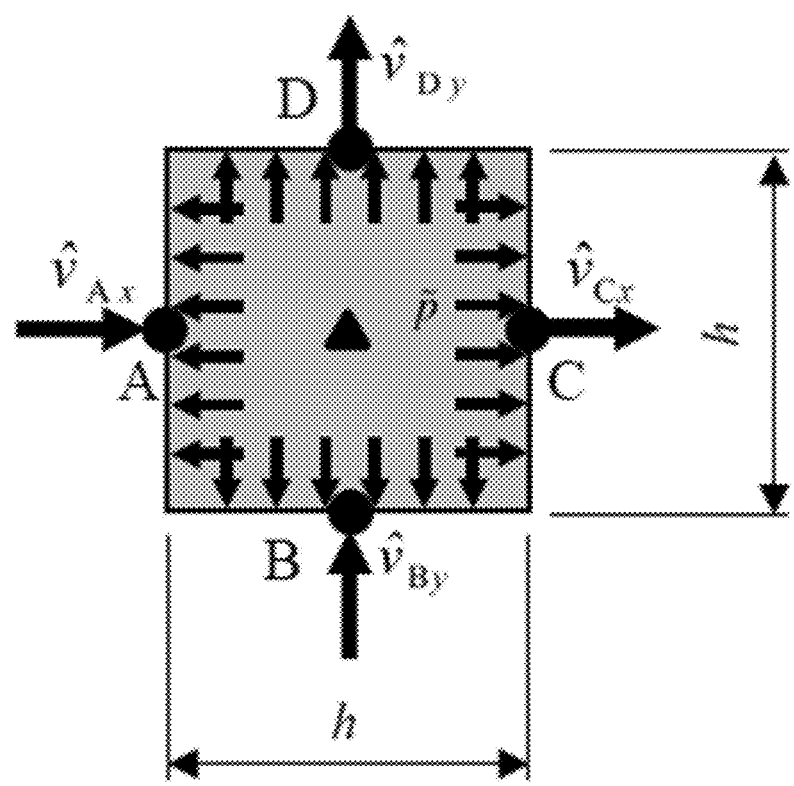
FIG. 3 is work rate done on each cell.

At each M-material node both the internal energy and its rate of change can be stored. The rate of change of the internal energy is due to energy transport, any chemical reactions, and work rate. The work rate due to pressure is calculated using the following formula and shown schematically in FIG. 3:

$$\dot{W} = (\hat{v}_{Ax} + \hat{v}_{By} - \hat{v}_{Cx} - \hat{v}_{Dy})\tilde{\rho}h \quad (11)$$

where $\tilde{p}$ is the current pressure at the material node, $\hat{v}_{Ax}$ and $\hat{v}_{Cx}$ are the x components of the previous fluid velocity at X-velocity nodes A and C respectively, $\hat{v}_{By}$ and $\hat{v}_{Dy}$ are the y components of the previous fluid velocity at Y-velocity nodes B and D respectively, while h is the cell size.

After the work rate is calculated, the previous internal energy at the M-material node due to the work rate is updated:

$$\hat{E} = \hat{E} + \dot{W}\Delta t \quad (12)$$

This updated previous internal energy (from the previous time step) is used in subsequent energy transport; in a sense the work rate is resolved on a temporary Lagrangian grid and the subsequent energy transport brings it back to the Eulerian grid.

Figure 4A:
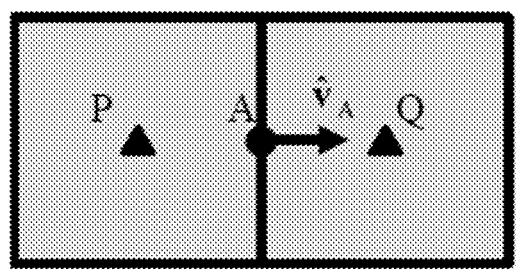
FIGS. 4A-4B are mass transport in the x direction.
Figure 4B:
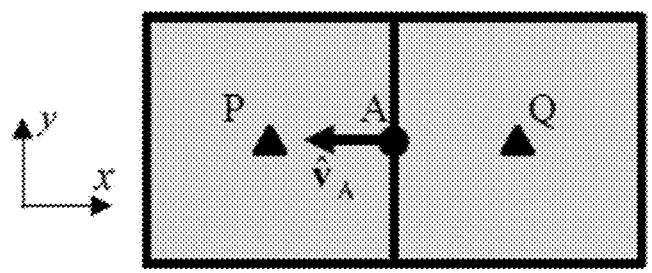

The mass transport is considered between neighboring material nodes, for example, M-material nodes P and Q in FIGS. 4A-4B, with X-velocity node A in between them. Since the y component of the velocity at A does not produce any flux between M-material nodes P and Q, and since the x component of velocity vector at X-velocity node A is directly stored, the mass transport between M-material nodes P and Q is defined in terms of this velocity component. An upwind scheme is used in such a way that if the x component of the velocity is positive, the transport occurs from M-material node P to M-material node Q. In a similar way, for a negative x component of the velocity, the transport occurs from M-material node Q to M-material node P.

At M-material nodes P and Q both the total mass and the mass rate can be stored. Thus, the mass transport can reduce to:

$$\text{if } \hat{v}_{Ax} > 0 \begin{cases} \hat{m}_P = \hat{m}_P - \left(\frac{\hat{m}_P}{h}\right)\hat{v}_{Ax} \\ \hat{m}_Q = \hat{m}_Q + \left(\frac{\hat{m}_P}{h}\right)\hat{v}_{Ax} \end{cases} \text{if } \hat{v}_{Ax} < 0 \begin{cases} \hat{m}_P = \hat{m}_P - \left(\frac{\hat{m}_Q}{h}\right)\hat{v}_{Ax} \\ \hat{m}_Q = \hat{m}_Q + \left(\frac{\hat{m}_Q}{h}\right)\hat{v}_{Ax} \end{cases} \quad (13)$$

Where $\hat{m}_p$ and $\dot{\hat{m}}_p$ and $\hat{m}_Q$, $\dot{\hat{m}}_Q$ are the previous masses and mass rates at M-material nodes P and Q respectively, $\hat{v}_{Ax}$, is X-velocity node A's previous velocity in the x direction and h is the cell size. By analogy, a similar approach can be used in the calculation of the mass transport in the y direction.

Figure 5:
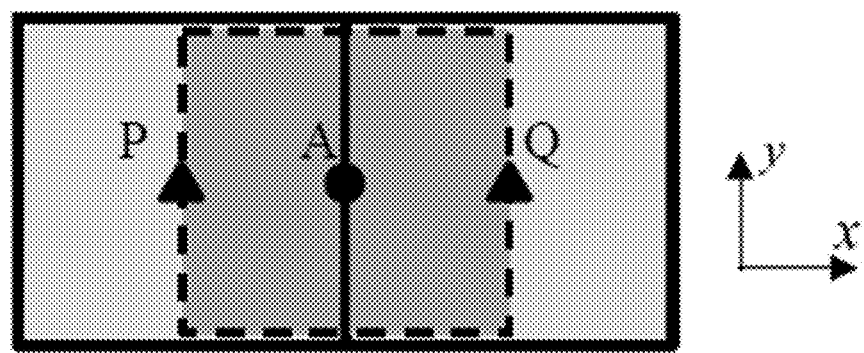
FIG. 5 is the mass and mass rate at X-velocity node A as a function of the M-material nodes quantities.

The mass and mass rate can be stored at M-material nodes. However, they can also be needed at X-velocity nodes and Y-velocity nodes. This can occur because the central difference time integration scheme can use mass and mass rate to update velocity at X-velocity nodes and Y-velocity nodes. For X-velocity nodes, shown in FIG. 5, the mass and mass rate are calculated from the neighboring M-material nodes P and Q:

$$\hat{m}_A = \frac{(\hat{m}_P + \hat{m}_Q)}{2} \quad (14)$$

$$\dot{\hat{m}}_A = \frac{(\dot{\hat{m}}_P + \dot{\hat{m}}_Q)}{2}$$

where $\hat{m}_A$ and $\dot{\hat{m}}_A$ are the previous mass and the current mass rate at the X-velocity node A, respectively, and $\hat{m}_P$, $\hat{m}_Q$ and $\dot{\hat{m}}_P$, $\dot{\hat{m}}_Q$ are the previous mass and the current mass rate at M-material nodes P and Q, respectively. Calculation of mass and mass rate at Y-velocity nodes can be performed similarly.

As mentioned before, energy transport is done after the work rate has already been applied and previous energy values have been updated. The process of calculating the energy transport between neighboring M-material nodes is similar to the one used for the mass transport shown schematically in FIGS. 4A-4B:

$$\text{if } \hat{v}_{Ax} > 0 \begin{cases} \dot{E}_P = \dot{E}_P - \left(\frac{\hat{E}_P}{h}\right)\hat{v}_{Ax} \\ \dot{E}_Q = \dot{E}_Q + \left(\frac{\hat{E}_P}{h}\right)\hat{v}_{Ax} \end{cases} \text{if } \hat{v}_{Ax} < 0 \begin{cases} \dot{E}_P = \dot{E}_P - \left(\frac{\hat{E}_Q}{h}\right)\hat{v}_{Ax} \\ \dot{E}_Q = \dot{E}_Q + \left(\frac{\hat{E}_Q}{h}\right)\hat{v}_{Ax} \end{cases} \quad (15)$$

where $\hat{E}_P$, $\dot{E}_P$, and $\hat{E}_Q$, $\dot{E}_Q$, are the previous total energy and the current energy rate at M-material nodes P and Q respectively. An analogous approach can be used for the calculation of the energy transport in the y direction.

At X-velocity nodes the x component of the momentum vector can be stored, while at Y-velocity nodes the y component of the momentum vector can be stored. At X-velocity nodes the x component of the rate of the momentum vector can also be stored, while at Y-velocity nodes the y component of the rate of the momentum vector can also be stored. The transport of x component of momentum vector in x direction, transport of y component of momentum vector in y direction, transport of x component of momentum vector in y direction, and transport of y component of momentum vector in x direction, can each be considered.

Figures 6A, 6B:
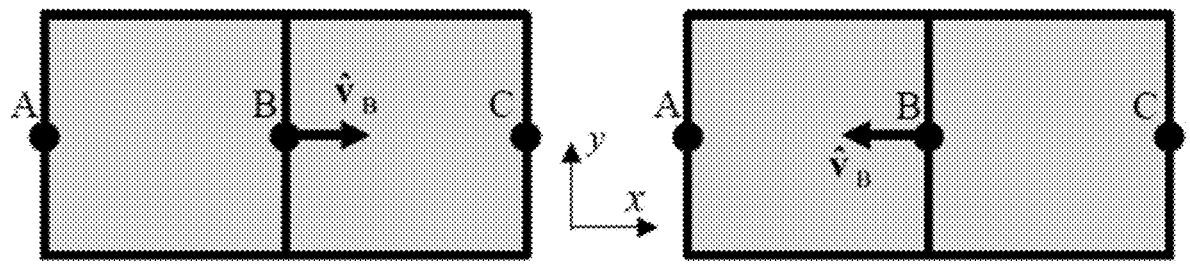
FIGS. 6A-6B show transport of x component of the momentum vector in x direction, with $\hat{v}_B>0$ in FIG. 6A and $\hat{v}_B<0$ in FIG. 7B.

Transport of x component of momentum vector in x direction can be considered as shown in FIGS. 6A-6B, and is calculated as follows:

$$(16)$$

$$\text{if } \hat{v}_{Bx} > 0 \begin{cases} \dot{L}_{Bx} = \dot{L}_{Bx} - \left(\frac{\hat{m}_B \hat{v}_{Bx}}{h}\right)\hat{v}_{Bx} \\ \dot{L}_{Cx} = \dot{L}_{Cx} + \left(\frac{\hat{m}_B \hat{v}_{Bx}}{h}\right)\hat{v}_{Bx} \end{cases} \text{if } \hat{v}_{Bx} < 0 \begin{cases} \dot{L}_{Ax} = \dot{L}_{Ax} - \left(\frac{\hat{m}_B \hat{v}_{Bx}}{h}\right)\hat{v}_{Bx} \\ \dot{L}_{Bx} = \dot{L}_{Bx} + \left(\frac{\hat{m}_B \hat{v}_{Bx}}{h}\right)\hat{v}_{Bx} \end{cases}$$

where $\hat{v}_{Bx}$ and $\hat{m}_B$ are the previous fluid velocity in x direction and the previous mass of X-velocity node B respectively, while $\dot{L}_{Ax}$, $\dot{L}_{Bx}$ and $\dot{L}_{Cx}$ are the x component of the current momentum rate at X-velocity nodes A, B, and C respectively.

Transport of y component of momentum vector in y direction can be done in complete analogy with the previous case, as shown in FIGS. 7A-7B.

Figures 8A, 8B:
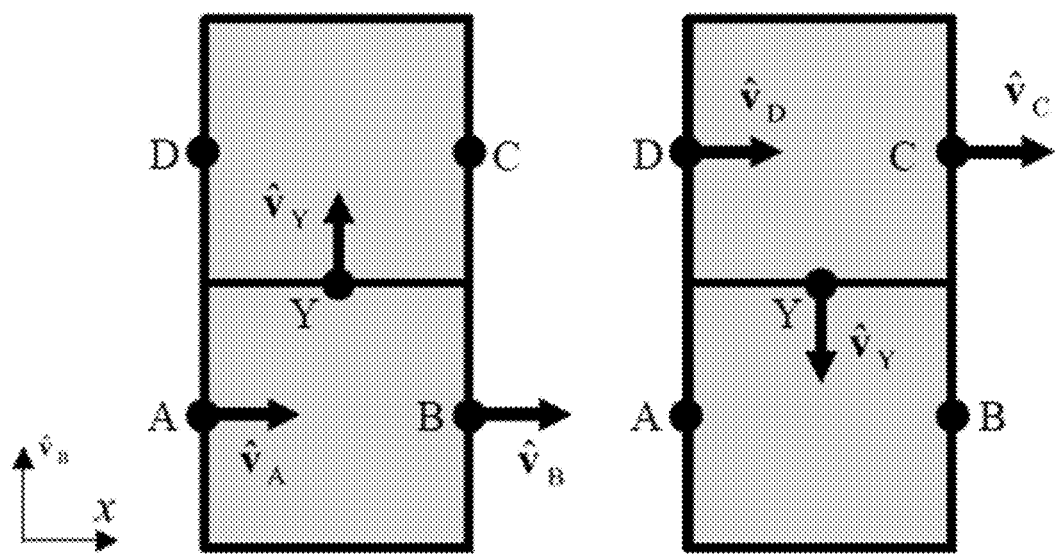
FIGS. 8A-8B show transport of x component of the momentum vector in y direction, with $\hat{v}_y > 0$ in FIG. 8A and $\hat{v}_y < 0$ in FIG. 8B.

Transport of x component of the momentum vector in y direction is shown in FIGS. 8A-8B. An upwind scheme can be used and depending on the y component of the velocity at Y-velocity node, the x momentum can be calculated using the following formula:

$$(17)$$

$$\text{if } \hat{v}_{Yy} > 0 \begin{cases} \dot{L}_{Dx} = \dot{L}_{Dx} + \frac{1}{2}\left(\frac{\hat{m}_A \hat{v}_{Ax}}{h}\right)\hat{v}_{Yy} \\ \dot{L}_{Ax} = \dot{L}_{Ax} - \frac{1}{2}\left(\frac{\hat{m}_A \hat{v}_{Ax}}{h}\right)\hat{v}_{Yy} \\ \dot{L}_{Cx} = \dot{L}_{Cx} + \frac{1}{2}\left(\frac{\hat{m}_B \hat{v}_{Bx}}{h}\right)\hat{v}_{Yy} \\ \dot{L}_{Bx} = \dot{L}_{Bx} - \frac{1}{2}\left(\frac{\hat{m}_B \hat{v}_{Bx}}{h}\right)\hat{v}_{Yy} \end{cases} \text{if } \hat{v}_{Yy} > 0 \begin{cases} \dot{L}_{Dx} = \dot{L}_{Dx} + \frac{1}{2}\left(\frac{\hat{m}_D \hat{v}_{Dx}}{h}\right)\hat{v}_{Yy} \\ \dot{L}_{Ax} = \dot{L}_{Ax} - \frac{1}{2}\left(\frac{\hat{m}_D \hat{v}_{Dx}}{h}\right)\hat{v}_{Yy} \\ \dot{L}_{Cx} = \dot{L}_{Cx} + \frac{1}{2}\left(\frac{\hat{m}_C \hat{v}_{Cx}}{h}\right)\hat{v}_{Yy} \\ \dot{L}_{Bx} = \dot{L}_{Bx} - \frac{1}{2}\left(\frac{\hat{m}_C \hat{v}_{Cx}}{h}\right)\hat{v}_{Yy} \end{cases}$$

Figures 9A, 9B:
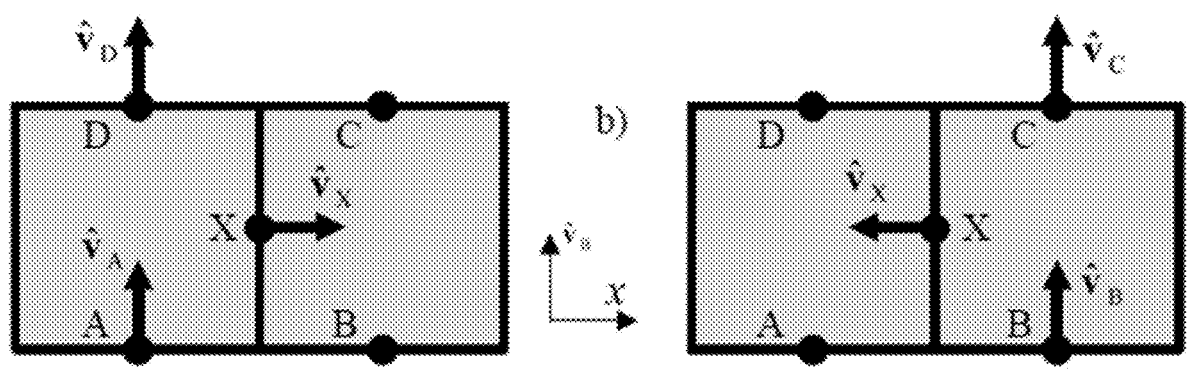
FIGS. 9A-9B show transport of y component of the momentum vector in x direction, with $\hat{v}_x > 0$ in FIG. 9A and $\hat{v}_x < 0$ in FIG. 9B.

Transport of y component of momentum vector in x direction is shown in FIGS. 9A-9B and the following formula can be employed:

$$(18)$$

$$\text{if } \hat{v}_{Xx} > 0 \begin{cases} \dot{L}_{By} = \dot{L}_{By} + \frac{1}{2}\left(\frac{\hat{m}_A \hat{v}_{Ay}}{h}\right)\hat{v}_{Xx} \\ \dot{L}_{Ay} = \dot{L}_{Ay} - \frac{1}{2}\left(\frac{\hat{m}_A \hat{v}_{Ay}}{h}\right)\hat{v}_{Xx} \\ \dot{L}_{Cy} = \dot{L}_{Cy} + \frac{1}{2}\left(\frac{\hat{m}_D \hat{v}_{Dx}}{h}\right)\hat{v}_{Xx} \\ \dot{L}_{By} = \dot{L}_{By} - \frac{1}{2}\left(\frac{\hat{m}_D \hat{v}_{Dx}}{h}\right)\hat{v}_{Xx} \end{cases} \text{if } \hat{v}_{Xx} < 0 \begin{cases} \dot{L}_{By} = \dot{L}_{By} + \frac{1}{2}\left(\frac{\hat{m}_B \hat{v}_{By}}{h}\right)\hat{v}_{Xx} \\ \dot{L}_{Ay} = \dot{L}_{Ay} - \frac{1}{2}\left(\frac{\hat{m}_B \hat{v}_{By}}{h}\right)\hat{v}_{Xx} \\ \dot{L}_{Cy} = \dot{L}_{Cy} + \frac{1}{2}\left(\frac{\hat{m}_C \hat{v}_{Cx}}{h}\right)\hat{v}_{Xx} \\ \dot{L}_{Dy} = \dot{L}_{Dy} - \frac{1}{2}\left(\frac{\hat{m}_C \hat{v}_{Cx}}{h}\right)\hat{v}_{Xx} \end{cases}$$

For each X-velocity node and Y-velocity node, a central difference time integration scheme can first update the velocity which can be followed by updating the mass. The velocity update is done using the following formula $$\check{v} = \hat{v} + \left(\frac{\dot{L}}{\hat{m}} - \frac{\dot{m}}{\hat{m}}\hat{v}\right)\Delta t \quad (19)$$

where $\check{v}$ and $\hat{v}$ are the intermediate and the previous velocities respectively, $\hat{m}$ is the previous mass, $\dot{L}$ is the current momentum rate, $\dot{m}$ is the current mass rate and $\Delta t$ is the time step size.

The above formula can be derived by considering the previous time step's conservation of momentum to the current time step (assuming a constant mass and momentum rate):

$$v(\tau)(\hat{m}+\dot{m}\tau)=\hat{m}\hat{v}+\dot{L}\tau \quad (20)$$

where $\hat{v}$ is the previous velocity, $\hat{m}$ is the previous mass, $\dot{L}$ is the current momentum rate, $\dot{m}$ is the current mass rate, and $\tau$ is the time elapsed since the previous time step.

The average acceleration is therefore given by $$a = \frac{v(\tau) - \hat{v}}{\tau} = \frac{\frac{\hat{m}\hat{v} + \dot{L}\tau}{\hat{m} + \dot{m}\tau} - \hat{v}}{\tau} = \frac{(\dot{L} - \dot{m}\hat{v})}{(\hat{m} + \dot{m}\tau)} \quad (21)$$

In the limit when $\tau \to 0$, the average acceleration is $$a = \frac{\dot{L} - \dot{m}\hat{v}}{\hat{m}} = \frac{\dot{L}}{\hat{m}} - \frac{\dot{m}}{\hat{m}}\hat{v} \quad (22)$$

which is in essence equation (19), (q.e.d.).

After velocity has been updated, the mass of each M-material node can be updated using the following formula:

$$\tilde{m}=\hat{m}+\dot{m}\Delta t \quad (23)$$

where $\tilde{m}$ is the current mass, $\hat{m}$ is the previous mass and $\dot{m}$ is the mass rate. In a similar way, the energy of each M-material node can be updated using the following formula:

$$\tilde{E}=\hat{E}+\dot{E}\Delta t \quad (24)$$

where $\tilde{E}$ and $\hat{E}$ are the current and previous energies at the M-material node and $\dot{E}$ is the energy rate.

At this stage, the solver can enforce any boundary conditions and apply fluid-solid interaction.

Figure 10:
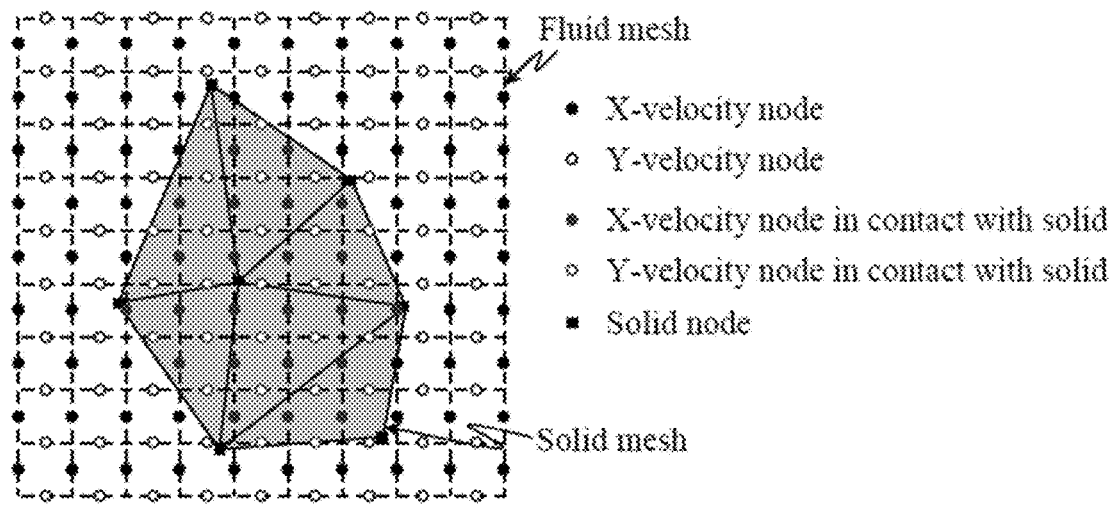
FIG. 10 is a depiction of the contact detection between solid and fluid in FDEM.

In representative examples, an interaction between solid and fluid in the combined finite-discrete element method uses an immersed boundary method. First, a contact search between X-velocity nodes and Y-velocity nodes and the solid finite element domains is conducted, with an illustrative depiction shown in FIG. 10. Standard combined finite-discrete element method-based contact detection and rendering procedures can be employed as described elsewhere.

Figures 11A, 11B:
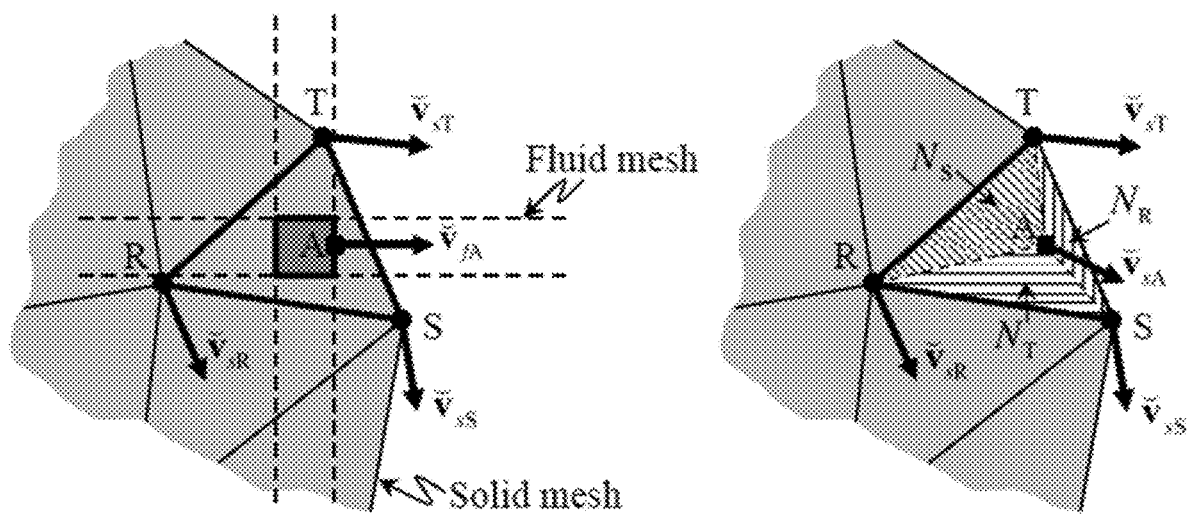
FIGS. 11A-11B are depictions of the contact interaction between solid and fluid in FDEM.

After the contact is detected, the velocity of the solid is corrected as follows:

$$\tilde{v}_s = \bar{v}_s + \frac{\tilde{f}}{\hat{\rho}_s}\Delta t \quad (25)$$

where $\tilde{v}_s$ and $\bar{v}_s$ are the current corrected and the intermediate velocity of the solid, $\tilde{f}$ is the iteraction force per unit volume between the fluid and solid, $\hat{\rho}_s$ is the previous density of the solid finite element. The velocity of the fluid is corrected using the same interaction force.

$$\tilde{v}_f = \bar{v}_f - \frac{\tilde{f}}{\hat{\rho}_f}\Delta t \quad (26)$$

where $\tilde{v}_f$ and $\bar{v}_f$ are the current corrected and intermediate velocity of the fluid and $\hat{\rho}_f$ is the previous density of the fluid, see FIGS. 11A-11B.

The current interaction force, $\tilde{f}$, between solid and fluid is calculated per unit volume and is assumed to be proportional to the relative velocity between fluid and solid:

$$\tilde{f} = \kappa(\tilde{v}_f - \tilde{v}_s) \quad (27)$$

with $\kappa$ being an interaction parameter, which can be considered as either an artificial penalty term or a material parameter describing the permeability of a porous solid (i.e., inversely proportional to the permeability of the solid), such as in seepage flow. By combining equations (25), (26) and (27), one obtains $$\tilde{v}_f = \frac{\bar{v}_f(\hat{\rho}_s + \kappa\Delta t) + \bar{v}_s\frac{\hat{\rho}_s}{\hat{\rho}_f}\kappa\Delta t}{\left(\hat{\rho}_s + \kappa\Delta t\left(1 + \frac{\hat{\rho}_s}{\hat{\rho}_f}\right)\right)} \quad (28)$$

$$\tilde{v}_s = \frac{\bar{v}_s(\hat{\rho}_f + \kappa\Delta t) + \bar{v}_f\frac{\hat{\rho}_f}{\hat{\rho}_s}\kappa\Delta t}{\left(\hat{\rho}_f + \kappa\Delta t\left(1 + \frac{\hat{\rho}_f}{\hat{\rho}_s}\right)\right)} \quad (29)$$

After the velocities are determined, the force is calculated by back substitution into equation (26):

$$\tilde{f} = \frac{\hat{\rho}_f}{\Delta t}(\bar{v}_f - \tilde{v}_f) \quad (30)$$

This interaction force then can be used to calculate additional nodal forces (due to fluid-solid interaction) in accordance with FDEM practices and methods known by skilled artisans and thus to obtain the corrected nodal velocities on the FDEM finite element mesh describing the solid.

Thus, disclosed fluid solver formulations can reproduce Navier-Stokes equations adaptable to different fluids, and use an immersed boundary method between fluid and solid meshes. While the fluids and solids are immersed (e.g., overlapping), a relative velocity exists between the fluid and solids, and then the interaction parameter $\kappa$ can be applied to determine velocities, and then interaction force, as discussed above. Significantly, the determination of the interaction force is done implicitly rather than explicitly. Thus, while the time step of the explicit time integration calculations of the fluid or combined FDEM solver may be restricted by components or features of the system (e.g., stiffness), representative solver examples can avoid further restriction or imposition of artificial limits on time step of the explicit time integration calculations of the numerical simulation by resolving the interaction force implicitly. In general, explicit methods calculate a state of a system at a later time from the state at a current time while implicit methods determine a solution by solving an equation involving both the current state of the system and the later one.

For example, in implicit determinations for a linear system, a matrix of the system is compiled, and the matrix is inverted to obtain results after a certain time. In general, a feature of implicit determinations is that you can advance with large time steps. With explicit solvers, which are more suitable for nonlinear problems, a large matrix is not compiled and instead time is advanced in small time increments so that a solution is obtained by progressing with the small time increments. Thus, the time step can be limited, so as to avoid instability or computational crashes. In disclosed examples, with fluid and solid integrated together, the resolution of the interaction force between the two domains can be performed in an implicit manner, and so does not present any further limitation on time increment of the explicit computations.

In selected examples, fluid mesh elements can be donated dynamically to the solid mesh during a numerical simulation. For example, if a solid cracks or deforms, melts (e.g., due to the amount of work done), or becomes rubble (e.g., if a solid is deformed past a plasticity point, and it is determined that the solid is not a continuum anymore but is rubble instead), a problem occurs in how to describe the behavior of the loose, rubble, or melted material using a Lagrangian framework. The problem is also particularly challenging with very large deformations on the Lagrangian mesh. By having the overlapping of the fluid and solid mesh, at any time step a material change criterion can be checked to determine whether solid elements (e.g., aforementioned triangular nodes) have melted or become rubble. If the criterion is true, then the elements can be removed from evolutionary iterations of the Lagrangian solid solver and instead donated to the Eulerian fluid solver. In particular, mass, momentum, and energy of Lagrangian elements can be donated to the Eulerian solver.

Figure 12:
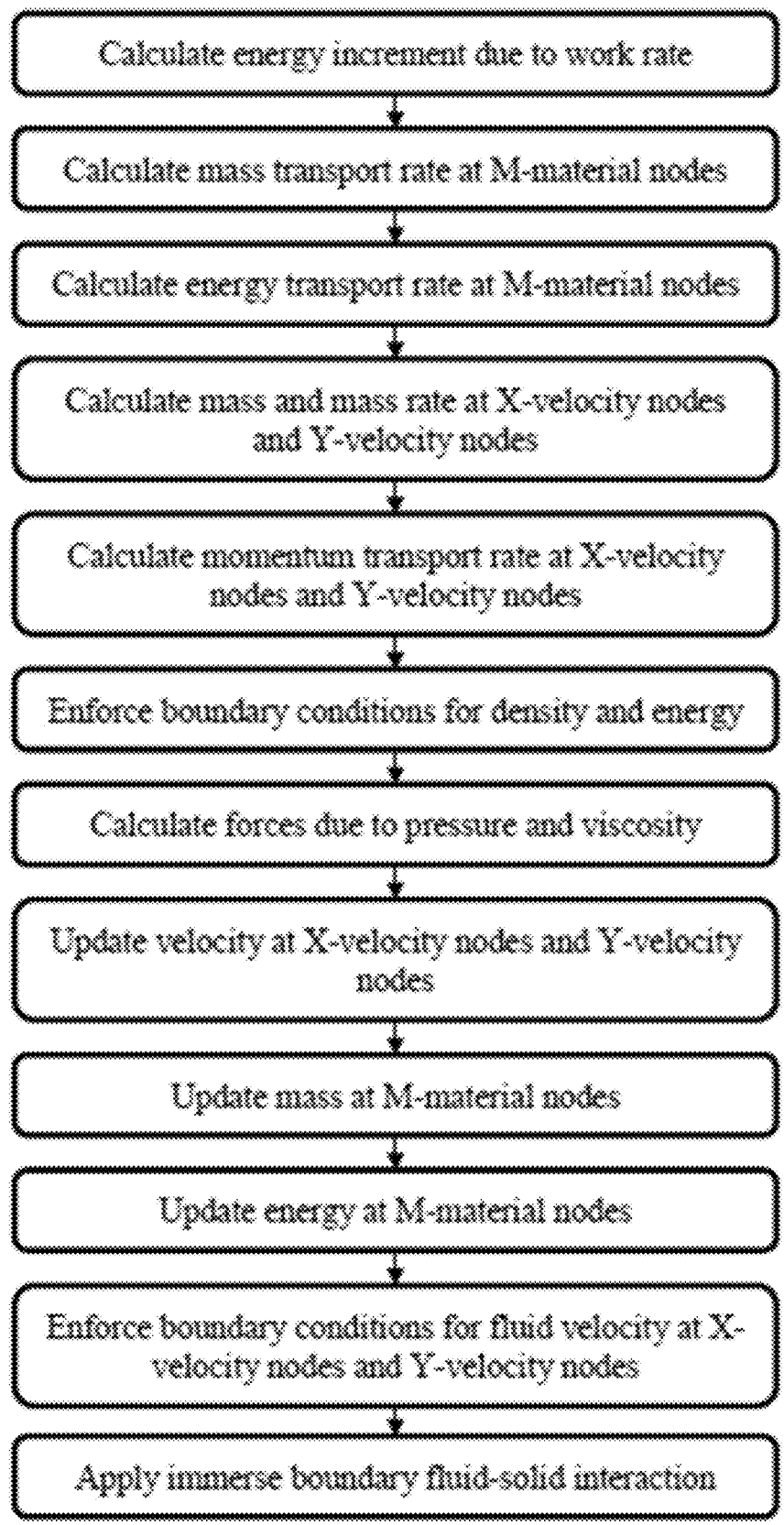
FIG. 12 is a flowchart indicating an order of execution of the algorithms.

The above disclosed procedures have been implemented into the FDEM software package called HOSS (Hybrid Optimization Software Suite). HOSS is a state-of-the-art FDEM package incorporating sophisticated contact interaction, contact detection, parallelization, fracture, deformability and material models. HOSS comprises 2D and 3D modules; current FSIS implementation has been done in 2D. Extension to 3D can be deduced from this disclosure. A particular implementation can follow the flowchart shown in FIG. 12. Each of the steps can be explicit time-integration based steps, and the bottom step of applying the immerse boundary fluid-solid interaction can be implicit. Significantly, representative examples integrate, as opposed to couple, the fluid solver into combined FDEM. For example, instead of having different codes that couple together so as to communicate variables, mesh states, etc., so that the different codes interact, fluid solver examples herein can be incorporated/integrated directly into the FDEM framework such that a single code includes a fluid part and solid part as a multi-physics solver. In examples that do not have fluid or do not require fluid computations, the fluid code part can be optionally deselected or turned off so as to reduce computational resources.

Using the above approaches, a number of benchmark type problems and applications have been solved and are presented hereinafter, including representative large-scale problems that have been simulated.

II. Numerical Examples and Benchmarks

2D Stress Wave Propagation from a Single Source. In this example, a single high energy source is placed in the center of the 2D mesh. The fluid pressure is modeled using an ideal gas EOS, as follows $$\tilde{p} = -\tilde{\rho} R_{spec} \tilde{T} \tag{31}$$

where $\tilde{p}$ is the current pressure, $R_{spec}$ is the specific gas constant and $\tilde{T}$ is the current temperature, which is given by $$\tilde{T} = \frac{\tilde{E}}{\tilde{m} c_v} \tag{32}$$

where $\tilde{E}$ and $\tilde{m}$ are the current energy and current mass at each M-material node, while cv is the specific heat at constant volume of the gas. It is worth noting that $R_{spec} = c_v (\gamma - 1)$ where $\gamma$ is the ratio of the specific heat at constant pressure and the specific heat at constant volume ($\gamma = c_p / c_v$), so equation (32) reduces to $$\tilde{p} = -(\gamma - 1) \tilde{E} / \tilde{V} \tag{33}$$

An instantaneous source is introduced by an initial deposition of energy ($\bar{e} = 1.0$ MJ/kg) at time t=0 inside the cell located at the center of the mesh. From the onset the high pressure and high temperature gases contained in the source cell expand though the fluid domain with a wave front in the form of a circular shape, as shown in FIG. 13. This example demonstrates that the fluid solver does not have preferential directions in terms of the wave speed and the symmetry of the problem is preserved.

Figure 14A:
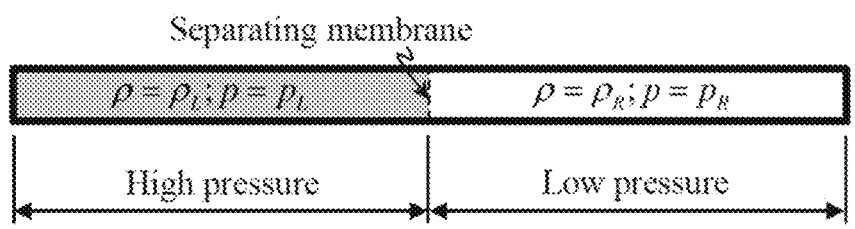
FIGS. 14A-14B are a schematic of the setup of the Sod problem.
Figure 14B:
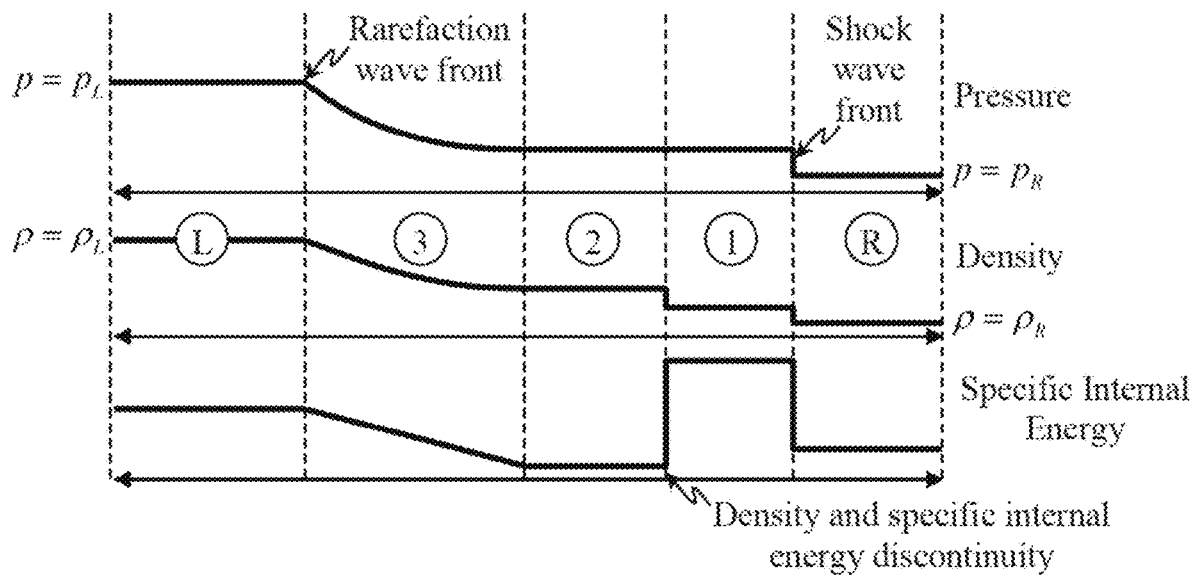

1D Compressible Flow—Sod Problem. The setup of the Sod problem, also known as the shock tube problem, is shown in FIG. 14A. In this problem two gases at different pressures, $p_L > p_R$, and with different densities, $\rho_L > \rho_R$, are separated by an imaginary rigid membrane placed in the middle of the tube. Given a sudden burst of this membrane, the two gases in the tube try to equilibrate pressures and temperatures, thus creating a shock wave that travels from the middle of the tube towards the right and a rarefaction wave traveling from the middle of the tube towards the left. The following initial conditions were set for this example: $\rho_L = 1.0$ kg/m$^3$, $p_L = 0.1$ MPa, $\rho_R = 0.125$ kg/m$^3$, $p_R = 0.01$ MPa and $\gamma = 1.4$ (see equation 33)). In FIG. 14B, at a given point in time we highlight the results for five different areas, as shown in FIG. 14A: area L (left), where the gas is still at high-pressure high-density conditions; area R (right), where the gas is still at low-pressure low-density conditions; area 1, which is right behind the shockwave traveling into the low-pressure low-density area; area 2, which is right behind the density and specific internal energy discontinuity traveling behind the shockwave; and area 3, which contains the rarefaction zone.

The theoretical results for this type of problem can be found elsewhere. The results obtained using the FSIS developed in this work are shown in FIGS. 15A-15I. The obtained results show very good agreement with the analytical solution.

Figure 16:
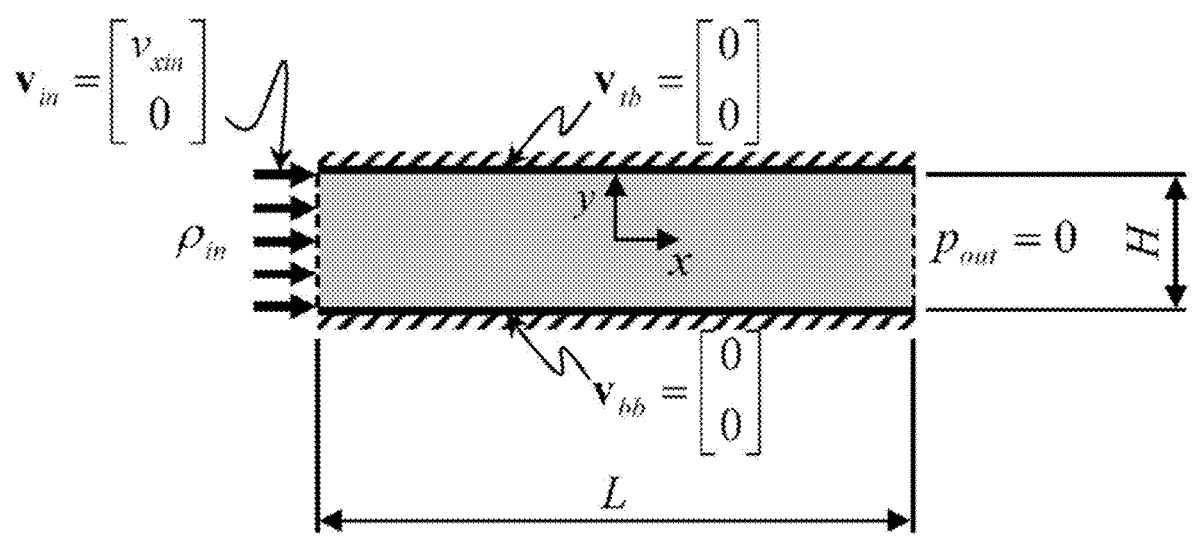
FIG. 16 is a general setup for the planar Poiseuille flow problem, with the inlet velocity, $v_{in}$, and the inlet density, $\rho_{in}$, are fixed, as it is the outlet pressure, $p_{out}$. The velocity boundary conditions at the interface between the fluid and the top and bottom plates are prescribed by $v_{tb}$ and $v_{bb}$ respectively.
Figure 17A:
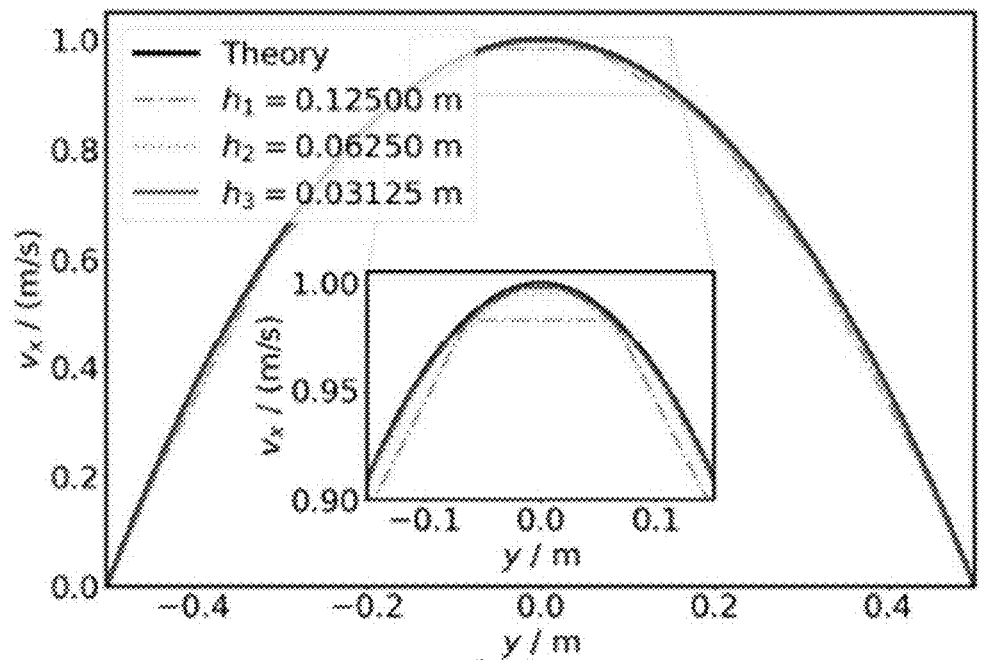
FIGS. 17A-17B shows results obtained for the mesh sizes used in this example for a flow between parallel plates.
Figure 17B:
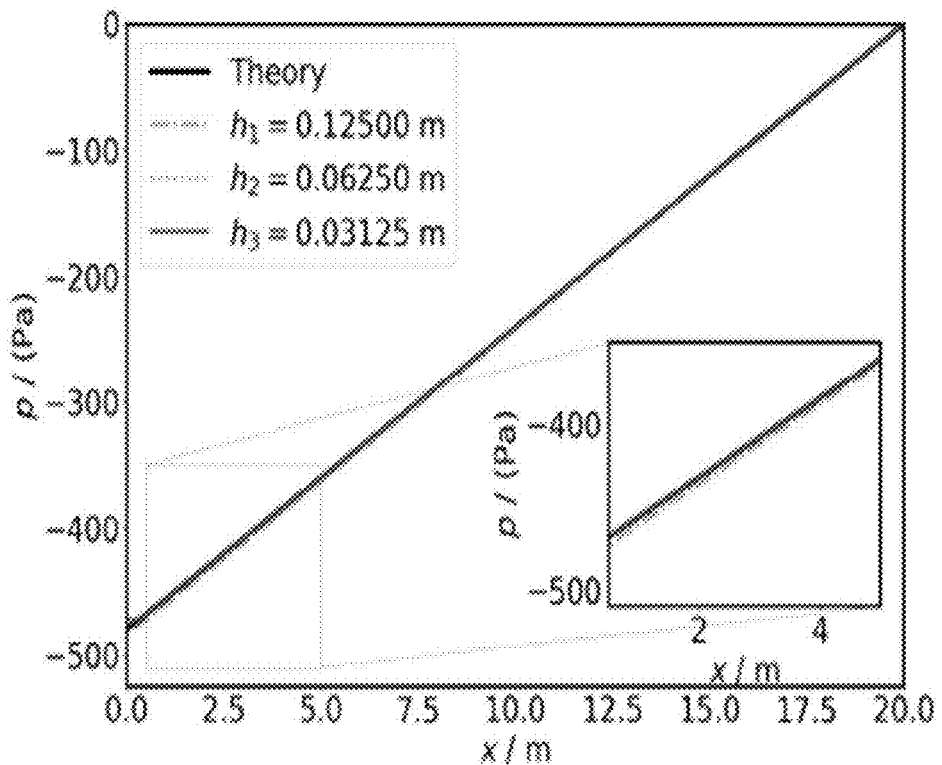

Planar Poiseuille Flow. For a successful planar Poiseuille flow simulation, the steady state solution for a viscous nearly incompressible laminar fluid flow driven by a pressure gradient between two parallel plates must be achieved. The general setup of the problem is shown in FIG. 16. The inlet density, $\rho_{in}$, and velocity, $v_{in}$, and the outlet pressure, $p_{out}$, are prescribed. No slip boundary conditions between the fluid and the plates are also enforced during the simulation. The dimensions of the fluid channel are L=20.0 m and H=1.0 m. Three different mesh sizes were tested in this benchmark exercise: $h_1 = 0.12500$ m, $h_2 = 0.06250$ m, and $h_3 = 0.03125$ m. The values used in this example for the dynamic or first viscosity and for the second viscosity are $\mu = 3.0$ Pa s and $\xi = 0.0$ Pa s respectively. The x component of the inlet velocity, $v_{xin}$, was set in such a way that the x component of the maximum velocity across the cross section of the 2D channel, $v_{xmax} = 1.0$ m/s, while the initial density of the fluid was set to $\bar{\rho} = 1.0$ kg/m$^3$. The equation of state used in this benchmark example is the following $$p = -\frac{1}{2} k \left( \frac{\tilde{p}}{\bar{\rho}} - \frac{\bar{p}}{\tilde{\rho}} \right) \tag{34}$$

where k is the bulk modulus of the fluid while $\bar{\rho}$ and $\tilde{\rho}$ are the initial and the current density of the fluid respectively. In this work k=100.0 kPa.

It is evident that the simulation recovers the exact velocity profile and this is for all grid resolutions. This is because the viscosity component is integrated with second order accuracy with respect to the space (as explained in Section 2), which ensures that the exact result is achieved for a parabolic velocity profile.

Figure 18:
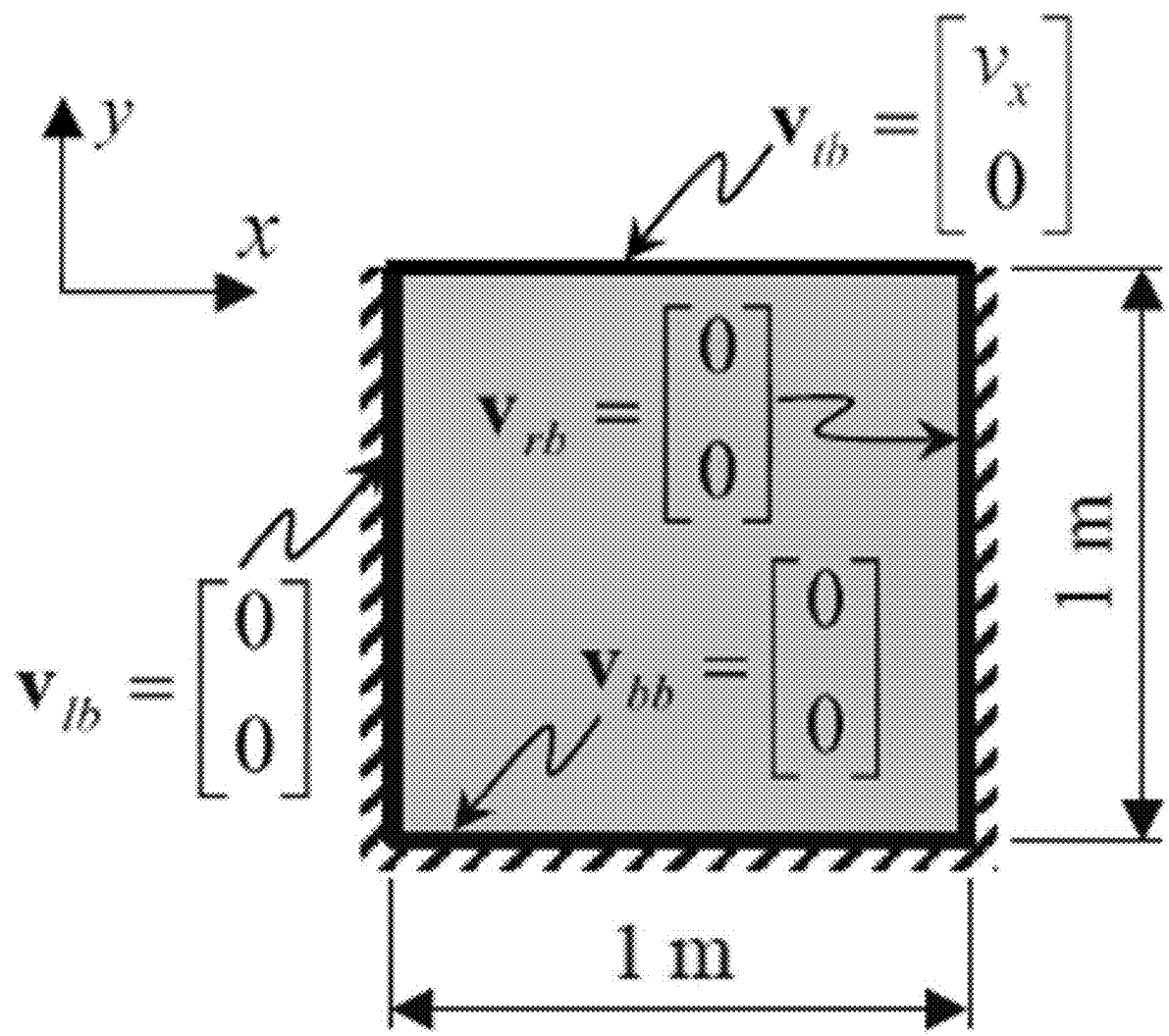
FIG. 18 is a general setup of the lid-driven cavity flow problem.

Lid-Driven Cavity Flow. As Erturk stated, "The lid-driven cavity flow is most probably one of the most studied fluid problems in the field of computational fluid dynamics." This problem was therefore selected in this work for the purpose of validation and verification of the FSIS. The setup of the problem is shown in FIG. 18. The initial density of the fluid was set to $\bar{\rho} = 1000.0$ kg/m$^3$, while the first (or dynamic) and second viscosities were set to $\mu = 0.1$ Pa s and $\xi = 0.0$ Pa s respectively, yielding a Reynolds number for the problem of 1000. Three different mesh sizes were used in this analysis: $h_1 = 0.00500$ m, $h_2 = 0.00250$ m, and $h_3 = 0.00125$ m. The simulation was run until steady state conditions were reached, and then the stream line patterns were compared against those obtained by Erturk. The obtained results are shown in FIGS. 19A-19C. The convergence of streamlines patterns in terms of grid resolution is clearly demonstrated (red lines correspond to the results obtained with the solver presented in this work—black lines correspond to the results from). A similar comparison (shown in FIGS. 20A-20C) was made against the results obtained from Botella and Peyret, where similar convergence is observed.

Von Karman Vortex Street. Another well-established benchmark problem in fluid dynamics is named after Theodore von Karman. The setup of the problem is shown in FIG.

Figure 21:
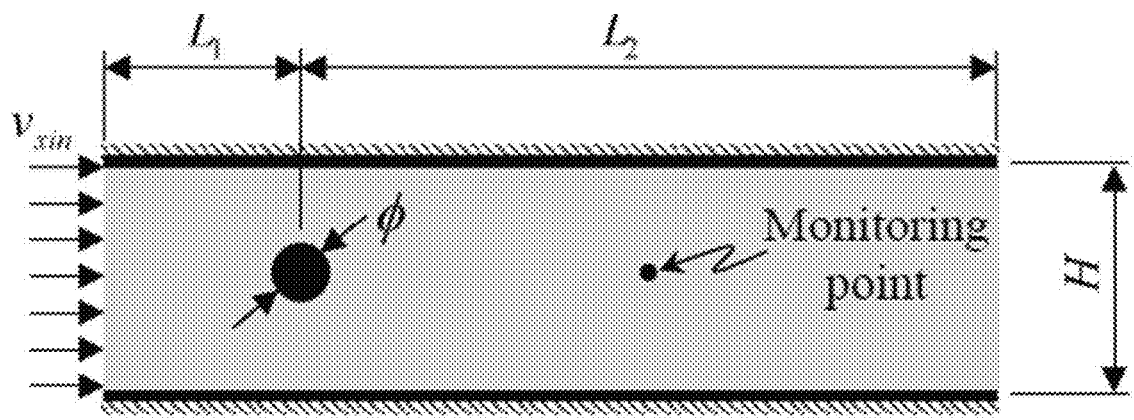
FIG. 21 is a problem setup for the Von Karman vortex street problem.
Figure 22:
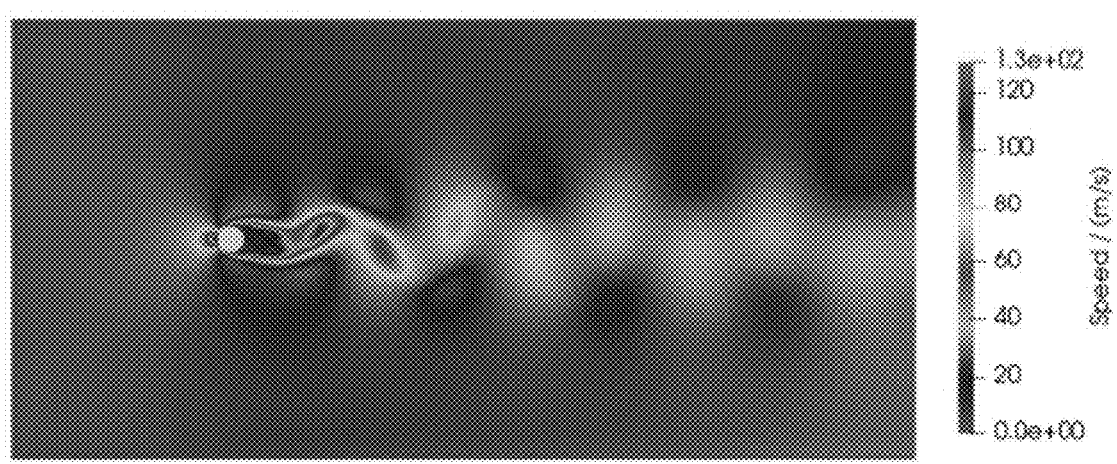
FIG. 22 shows a final frame map of fluid velocity at steady state of the Von Karman street simulation for a fine mesh size $h_3$=0.025 m.
Figure 23:
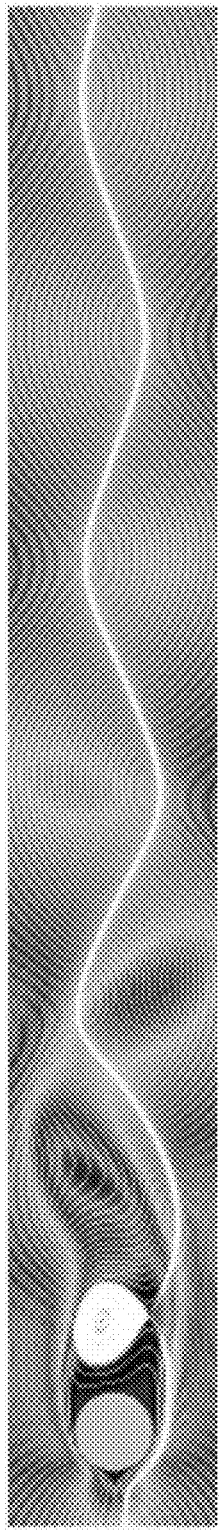
FIG. 23 is a detailed view of the final frame of the Von Karman street simulation showing the streamlines for a mesh size $h_3$=0.025 m.

21 where a circular obstacle is placed in the middle of a laminar flow between two fixed plates. In this work, the same dimensions adopted were used, i.e. $L_1=8$ m, $L_2=25$ m, $H=16$ m, and $\phi=1$ m. The fluid's viscosities were set to $\xi=0.0$ Pa s and $\mu=1.0$ Pa s, while the inlet fluid velocity was fixed at $v_{xin}=100$ m/s, yielding a Reynolds number of 100. Three different mesh sizes were used for this case, $h_1=0.100$ m, $h_2=0.050$ m, and $h_3=0.025$ m. A monitoring point (see FIG. 21) placed ten meters behind the center of the circular obstacle, is used to store the history of the fluid velocity during the simulations. FIG. 22 shows the steady state map of the fluid velocity for the finer mesh size, i.e., $h_3=0.025$ m. A detailed view of the streamlines of the flow behind the circular obstacle is shown in FIG. 23.

Figure 24A:
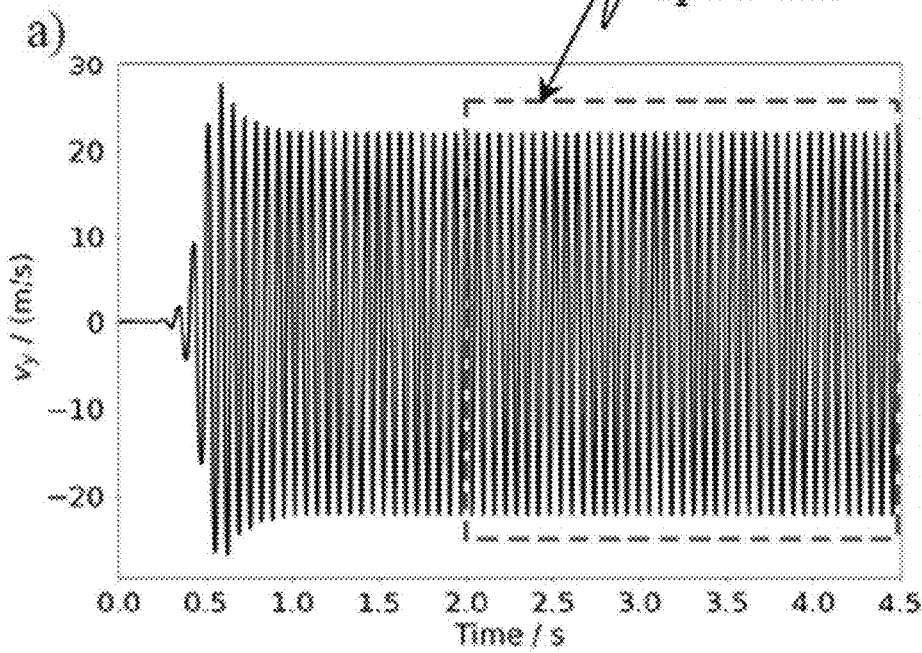
FIG. 24A is the time history of the y-component of the fluid velocity at the monitoring point.
Figure 24B:
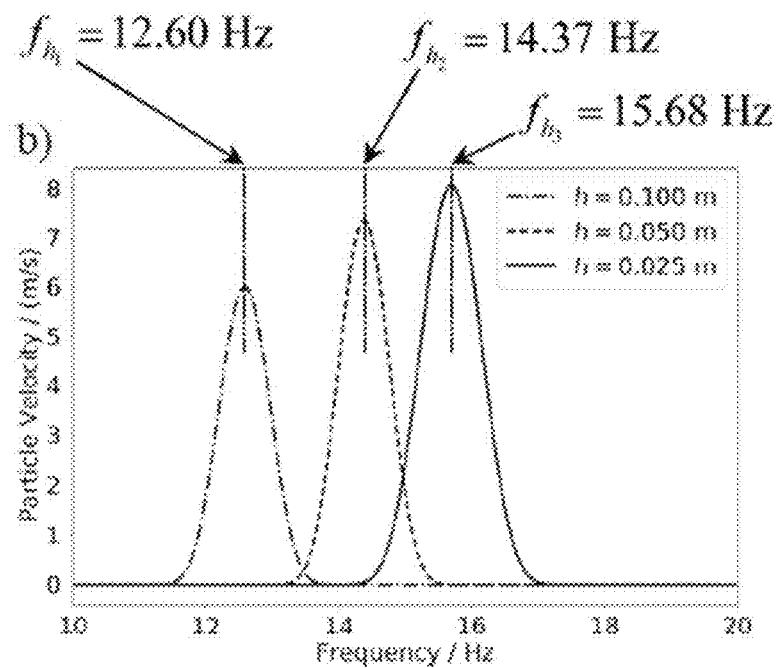
FIG. 24B is the spectra of the y-component of the fluid velocity.

An example of the time history of the y-component of the velocity at the monitoring point for the finer mesh ($h_3=0.025$ m) is shown in FIG. 24A. After the oscillations in the y-component of the velocity start to develop (around 0.2 s) it takes some time for the system to reach steady state conditions. In this analysis, Fast Fourier Transforms of the velocity time histories for the period of time defined by 2.0 s t 4.5 s were calculated and the frequency at which the peak of the spectra was observed was recorded (see FIG. 24B). the nature of the oscillatory flow behind the circular cylinder can be characterized via the Strouhal number which is given by $$St = fL/v \tag{35}$$

where f is the frequency of the oscillations, L is the representative dimension of the problem (in this case $L=\phi$) and v is the free stream velocity of the flow. It has been demonstrated experimentally that, for a Reynolds number of 100, $0.16 < St < 0.17$. The results obtained in this work show that, as the mesh size is decreased, the Strouhal number of the oscillatory flow behind the circular cylinder tends to the experimental range reported by Roshko, i.e., $St_{h_1}=0.1260$, $St_{h_2}=0.1437$, $St_{h_3}=0.1568$ for mesh sizes $h_1$, $h_2$, and $h_3$, respectively.

Figure 25:
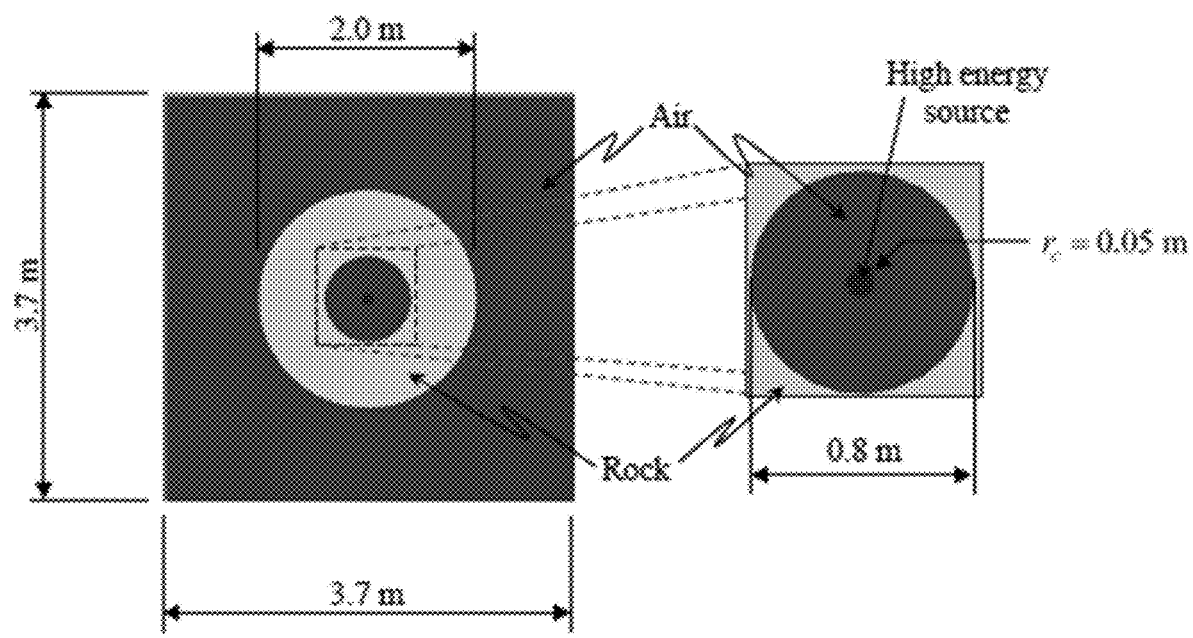
FIG. 25 shows the simulation problem setup for the fluid solver interacting with fracturing solids.

High Energy Source inside a Disk. In this section we demonstrate the robustness of the integrated solver in simulation of fluid driven fragmentation processes. The setup of the system is shown in FIG. 25, where a square fluid domain of 3.7 m size is considered. The setup of the system is shown in FIG. 25, where a square fluid domain of 3.7 m size is considered. A solid disk is placed inside the fluid domain and a high energy source is placed inside the fluid at the center of the disk (inset of FIG. 25). At t=0 s the high energy source is initiated at the center, which triggers the progressive initiation of the rest of the charge.

Figures 26A, 26B, 26C, 26D:
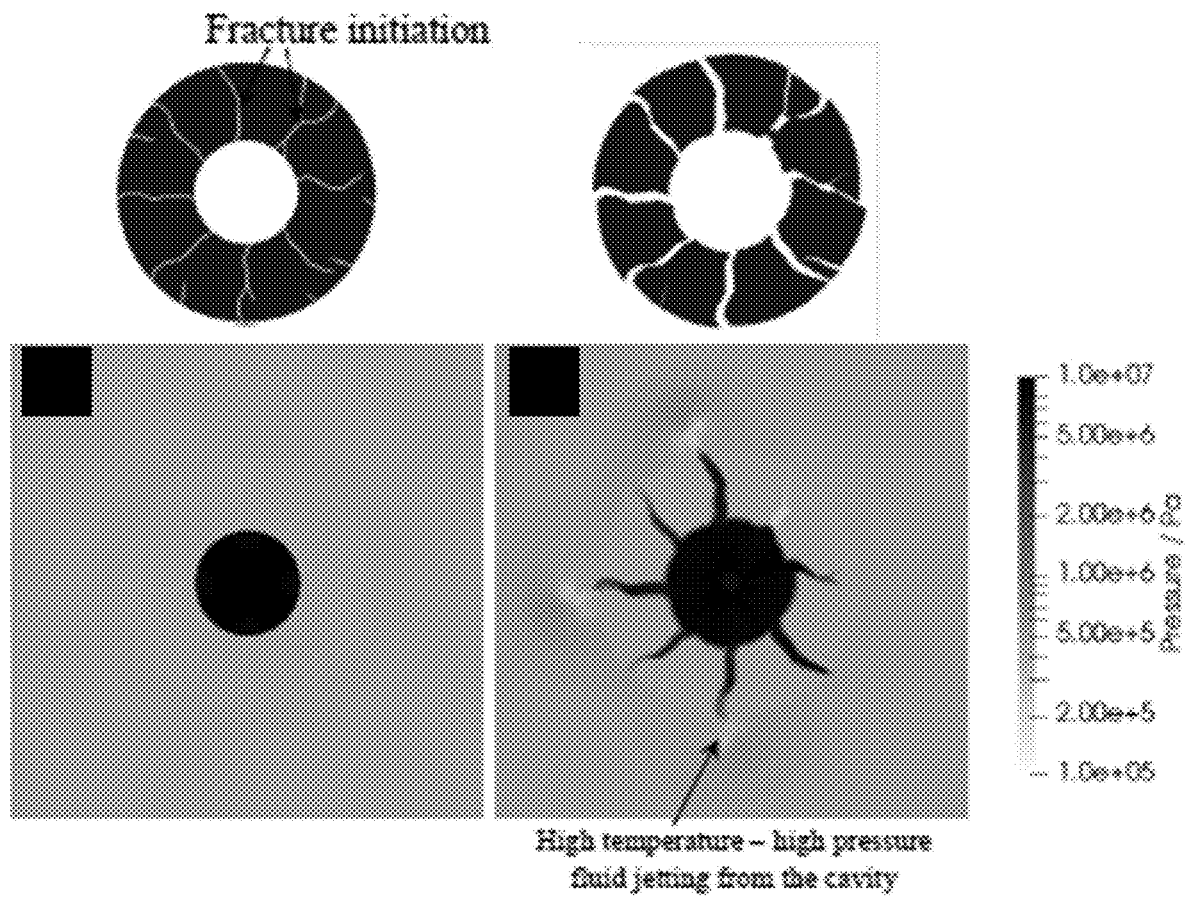
FIGS. 26A-26D are the evolution of the fracturing process in the rock disk and fluid pressure as the solid fractures and fragments.

FIGS. 26A-26D show two snapshots of the simulation results corresponding to time instances t=5.0e-04 s and t=4.0e-03 s; solid fragmentation is shown in FIG. 26A and FIG. 26B, while the corresponding fluid pressure fields are shown in FIG. 26C and FIG. 26D. It is worth noting that the solid fragmentation produces a natural path for escape ("jet out") of the high-pressure, high-temperature gases contained inside the cavity, as shown in FIG. 26D.

Figures 27A, 27B:
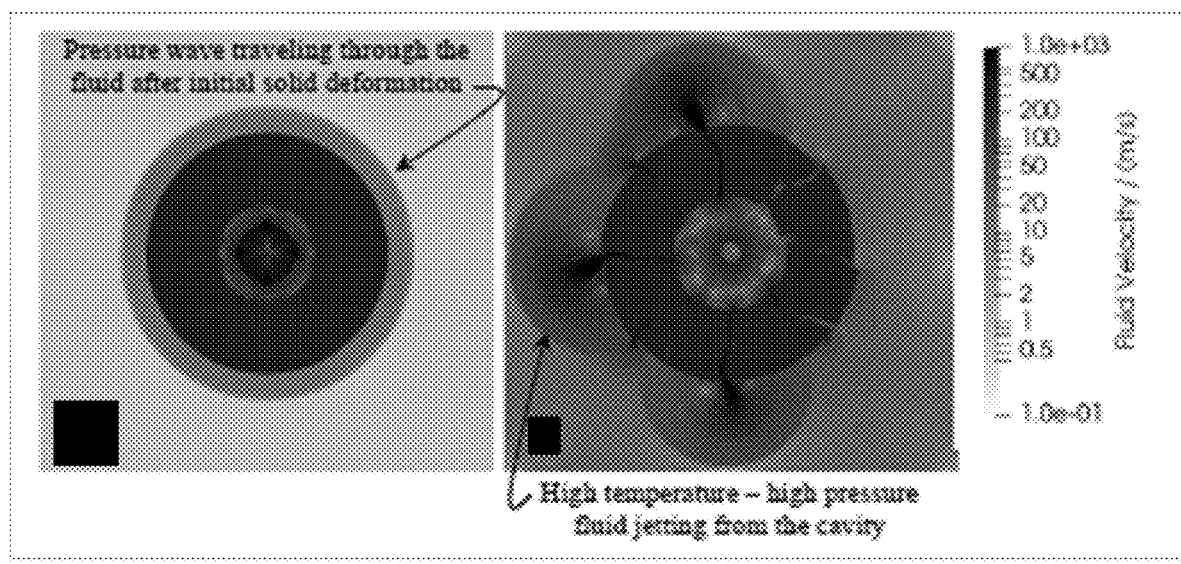
FIGS. 27A-27B are maps of the fluid velocity at different stages during the simulation.

FIGS. 27A-27B show two snapshots of the velocity of the fluid; at t=5.0e-04 s and t=4.0e-03 s. The pressure wave in the surrounding air is generated by the deformation of the solid. Later on, at t=4.0e-03 s and shown in FIG. 27B, the gas jetting, through the fractured solid, at high pressure and high temperature is clearly observed.

III. Exemplary Computing Environment

Figure 28:
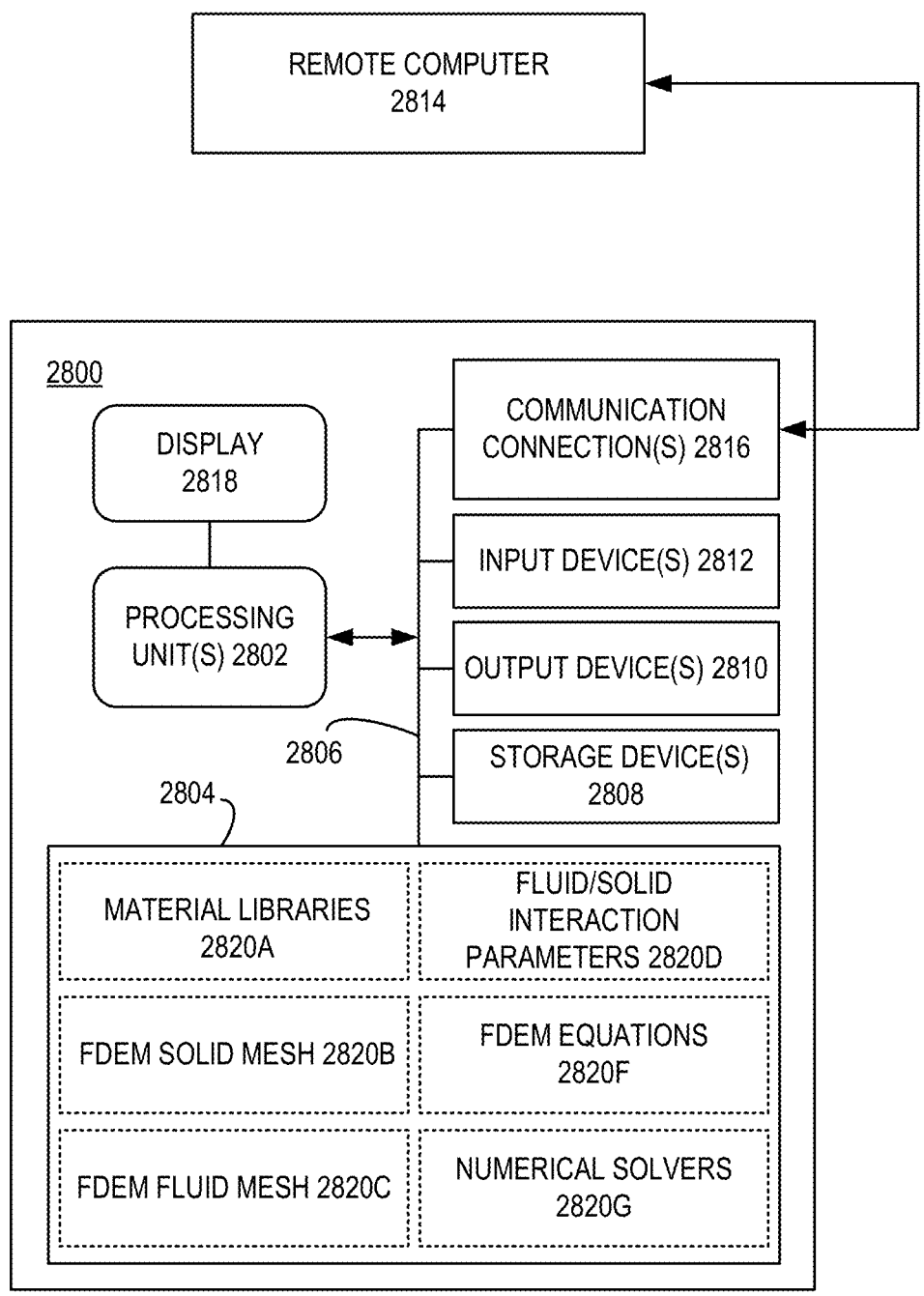
FIG. 28 is a schematic of an exemplary computing environment for carrying out disclosed methods.

FIG. 28 is an example of a computing system and environment 2800 configured to perform one or more FDEM simulations in accordance with disclosed examples of the technology modeling solid fractures including with fluids and fluid-solid interactions. In general, the disclosed technology is described in the general context of computer-executable instructions, such as program modules, being executed by a dedicated processor, or other digital processing system or programmable logic device. Generally, program modules include routines, programs, objects, components, data structures, libraries, etc., that perform particular tasks or implement particular data types. Moreover, examples of the disclosed technology herein may be implemented with other computer system configurations, including hand-held devices, multiprocessor systems, microprocessor-based or programmable consumer electronics, network PCs, minicomputers, mainframe computers, dedicated processors, MCUs, PLCs, ASICs, FPGAs, CPLDs, systems on a chip, and the like. The disclosed technology may also be practiced in distributed computing environments where tasks are performed by remote processing devices that are linked through a communications network. In a distributed computing environment, program modules may be located in both local and remote memory storage devices. Distributed processing can be particularly applicable in FDEM and related examples of the disclosed technology which tend to involve complex modeling, as computational resources for performing simulation can be demanding.

The computing system 2800 can include multiple components in a computing environment, including a processor 2802 (including multiple processors, distributed processors, etc.) and a memory 2804. The memory 2804 can have stored instructions executable by the processor 2802 for constructing FDEM meshes and/or executing one or more FDEM simulations. Different components of the computing environment, including the processor 2802 and memory 2804, can be coupled together with a system bus 2806. The system bus 2806 can include one or more of several types of bus structures including a memory bus or memory controller, a peripheral bus, and a local bus using any of a variety of bus architectures. The memory 2804 can include various types, including volatile memory (e.g., registers, cache, RAM), non-volatile memory (e.g., ROM, EEPROM, flash memory, etc.), or a combination of volatile and non-volatile memory. The memory 2804 is generally accessible by the processor 2802 and can store software in the form computer-executable instructions that can be executed by the processor 2802. In some examples, processors can be configured based on RISC or CISC architectures, and can include one or more general purpose central processing units, application specific integrated circuits, graphics or co-processing units or other processors. In some examples, multiple core groupings of computing components can be distributed among system modules, and various modules of software can be implemented separately.

The computing system 2800 also typically includes or is coupled to one or more storage devices 2808 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 2806 by a hard disk drive interface, a magnetic disk drive interface, and an optical drive interface, respectively. The drive or drives and associated computer-readable media can provide nonvolatile storage of computer-readable instructions, data structures, program modules, and other data for the computing system 2800. Other types of non-transitory computer-readable media which can store data that is accessible by a PC, such as magnetic cassettes, flash memory cards, digital video disks, CDs, DVDs, RAMs, ROMs, and the like, may also be used in the computing environment. The storage 2808 can be removable or non-removable and can be used to store information in a non-transitory way which can be accessed by the processor 2802 or other components within the computing environment.

A number of program modules (or data) may be stored in the memory 2804 and/or storage devices 2808, including an operating system, one or more application programs, other program modules, and program data that can be used to perform numerical simulations. A user may enter commands and information into the computing system 2800 through one or more input devices 2812 such as a keyboard and a pointing device such as a mouse. Other input devices may include a digital camera, microphone, satellite dish, scanner, display, or the like. These and other input devices are often connected to the one or more processors 2802 through a serial port interface that is coupled to the system bus 2806 but may be connected by other interfaces such as a parallel port, game port, or universal serial bus (USB). A display 2818 such as a monitor or other type of display device also can be connected to the system bus 2806 via an interface, such as a video adapter. Some or all data and instructions can be communicated with a remote computer 2814 through communication connections 2816 (e.g., wired, wireless, etc.) if desired.

As shown in FIG. 28, some examples can include one or more material libraries associated with different fluid/solid materials, in a memory 2820A. A user can construct one or more solid meshes 2820B and fluid meshes 2820C which can be subsequently related during a simulation through various contact detection schemes. The meshes 2820B, 2820C can include data associated with nodal position, displacement, geometry, material state, time step, etc. The processor 2802 can determine values of a fluid viscosity stress tensor of the fluid mesh 2820C by splitting the tensor into a pure shear part and a remainder part having different respective control volumes. One or more fluid/solid interaction parameters can be stored in a memory 2820D, which can for example describe an artificial penalty term or a material parameter describing the permeability of a porous solid (i.e., inversely proportional to the permeability of the solid), such as in seepage flow. The interaction parameters 2820D can be used with various FDEM equations 2820F and numerical solver routines 2820G to numerically iterate to determine interactions between the slid and fluid meshes 2820B, 2820C including by immersing mesh boundaries, computing fluid and solid velocities with the interaction parameters, and computing fluid-solid interaction force from the velocities. Iterations can occur with time synchronizations between meshes according to one or more selectable time steps. Other governing equations can be provided in the memory storing the FDEM equations 2820F, e.g., governing other nodal and mesh interactions. The memory storing the numerical solvers 28280G can include a combined FDEM solver and fluid solver though additional numerical solvers can be included and used for various meshes, including FEM, DEM, XDEM, AEM, MFEM, FDM, etc. Example fluid solvers can include equations that incorporate or calculate fluid transient pressure wave propagation, fluid viscosity, fluid equation of state, energy transport, momentum transport, and interaction with fracturing solid domains. The numerical solving processes and integration between meshes can also include examples in which mass, momentum, and/or energy of elements of the solid mesh can be donated to the fluid mesh at a time step of the numerical simulation based on a material change criterion at the time step.

In some instances numerical solver routines 2820G can also be nested or integrated into each other, such as by including a fluid solver portion within a combined FDEM solver. In representative examples, the fluid mesh iteration uses an explicit fluid solver, with the fluid-solid interaction between the fluid and solid meshes 2820C, 2820B being determined in an implicit way. Thus, disclosed examples can include a fully explicit compressible fluid solver incorporated into a combined finite-discrete element method, forming a fluid-solid integrated solver (FSIS) that can allow FDEM users to robustly model both solid deformation and fluid flow together with interaction between the solid and the fluid. Outputs from the numerical simulations, such as time evolutions, mesh cross-sections, etc., can be displayed using the display 2818. Examples can include simplified or streamlined numerical solvers or solving scenarios packaged in various computing environments, e.g., with interactions determined and described rapidly for display, including in recreational or training simulations, such as with virtual, augmented, or entertainment visualizations, with computations occurring locally and/or remotely to the visualization.

As discussed above, an interaction between a solid and a fluid can be resolved using an immersed boundary in such a way that in some solver examples the presence of the fluid solver adds less than 10% CPU overhead to the simulation. In particular examples, various CPU overhead amounts are minimized based on the integration of the fluid solver into the FDEM backbone, vice coupled (i.e., the fluid solver is fully incorporated into the FDEM framework instead of having two different codes communicating or couple with each other either via file system or memory), such that sub-step timing schemes can be avoided.

Benchmark tests and numerical experiments performed using the newly developed simulation tool demonstrate accurate reproduction of standard fluid flow benchmark problems. With the fluid and solid working together in an integrated manner, complex problems of flow through fracturing media and multi-phase physics simulations can be accurately addressed. Disclosed examples represent improvements in the effort of accurately incorporating fluid processes into FDEM transient dynamics. Disclosed examples are illustrated with 2D meshes for convenience, and can readily be extended to 3D environments more typically associated with fracture and fragmentation processes.

IV. General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Disclosed algorithms may be, for example, embodied as software or firmware instructions carried out by a digital computer. For instance, any of the disclosed fluid or solid solver techniques can be performed by a computer or other computing hardware (e.g., an ASIC or FPGA) that is part of a numerical simulation system. The numerical simulation system can be programmed or configured to perform numerical simulation computations (e.g., any of the numerical simulation techniques disclosed herein). The computer can be a computer system comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed numerical simulation techniques. The results of the computations can be stored (e.g., in a suitable data structure or lookup table) in the one or more tangible, non-transitory computer-readable storage media and/or can also be output to the user, for example, by displaying, on a display device, numerical simulation results, including 2D, 3D, time-evolved, etc., with a graphical user interface.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. A computer-implemented method, comprising:
providing a numerical simulation solid mesh comprising a plurality of solid nodes and a numerical simulation fluid mesh comprising a plurality of fluid nodes; and
performing a numerical simulation with the solid mesh and fluid mesh including:
determining a fluid-solid interaction between the fluid mesh and the solid mesh at a time step by:
(i) immersing boundaries of the solid and fluid meshes,
(ii) computing current corrected fluid and solid velocities using an interaction parameter applied to an intermediate fluid-solid relative velocity, and
(iii) computing a fluid-solid interaction force based on the current corrected fluid and solid velocities;
wherein the determining the fluid-solid interaction comprises an implicit determining within an explicit fluid solver of the numerical simulation;
wherein the explicit fluid solver is integrated, as opposed to coupled, into a combined finite-discrete element method (FDEM) solver of the numerical simulation.

2. The computer-implemented method of claim 1, wherein the interaction parameter is an artificial penalty.

3. The computer-implemented method of claim 1, wherein the interaction parameter is a material parameter describing a permeability of a porous solid.

4. The computer-implemented method of claim 1, wherein the fluid solver has a time step synchronized with a time step of the combined FDEM solver.

5. The computer-implemented method of claim 1, wherein the fluid solver is configured to address fluid transient pressure wave propagation, fluid viscosity, fluid equation of state, energy transport, momentum transport, and interaction with fracturing solid domains.

6. The computer-implemented method of claim 1, wherein the performing the numerical simulation further comprises:
determining values of a viscosity stress tensor of the fluid mesh by splitting the fluid viscosity stress tensor into a pure shear part and a remainder part having different respective control volumes.

7. The computer-implemented method of claim 1, wherein the performing the numerical simulation further comprises:
donating mass, momentum, and energy of elements of the solid mesh to the fluid mesh at a time step of the numerical simulation based on a material change criterion at the time step.

8. The computer-implemented method of claim 1, wherein the fluid mesh is an Eulerian mesh and the solid mesh is a Lagrangian mesh.

9. An apparatus, comprising:

at least one processor; and memory coupled to the at least one processor and configured with instructions that, when executed by the at least one processor, cause the apparatus to:

perform a numerical simulation with a solid mesh comprising a plurality of solid nodes and a fluid mesh comprising a plurality of fluid nodes including by:

determining a fluid-solid interaction between the fluid mesh and the solid mesh at a time step by:

(i) immersing boundaries of the solid and fluid meshes, (ii) computing current corrected fluid and solid velocities using an interaction parameter applied to an intermediate fluid-solid relative velocity, and (iii) computing a fluid-solid interaction force based on the current corrected fluid and solid velocities;

wherein the determining the fluid-solid interaction comprises an implicit determining within an explicit fluid solver of the numerical simulation, wherein the explicit fluid solver is integrated, as opposed to coupled, into a combined finite-discrete element method (FDEM) solver of the numerical simulation.

10. The apparatus of claim 9, wherein the interaction parameter is an artificial penalty.

11. The apparatus of claim 9, wherein the interaction parameter is a material parameter describing a permeability of a porous solid.

12. The apparatus of claim 9, wherein the fluid solver has a time step synchronized with a time step of the combined FDEM solver.

13. The apparatus of claim 9, wherein the fluid solver is configured to address fluid transient pressure wave propagation, fluid viscosity, fluid equation of state, energy transport, momentum transport, and interaction with fracturing solid domains.

14. The apparatus of claim 9, wherein the performing the numerical simulation further comprises:

determining values of a viscosity stress tensor of the fluid mesh by splitting the fluid viscosity stress tensor into a pure shear part and a remainder part having different respective control volumes.

15. The apparatus of claim 9, wherein the performing the numerical simulation further comprises:

donating mass, momentum, and energy of elements of the solid mesh to the fluid mesh at a time step of the numerical simulation based on a material change criterion at the time step.

16. The apparatus of claim 9, wherein the fluid mesh is an Eulerian mesh and the solid mesh is a Lagrangian mesh.

* * * * *